US011493320B2

(12) United States Patent
Sakawaki

(10) Patent No.: US 11,493,320 B2
(45) Date of Patent: Nov. 8, 2022

(54) METHOD FOR CALIBRATING GAP SENSOR

(71) Applicant: DAIKIN INDUSTRIES, LTD., Osaka (JP)

(72) Inventor: Atsushi Sakawaki, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 456 days.

(21) Appl. No.: 16/646,463

(22) PCT Filed: Sep. 29, 2017

(86) PCT No.: PCT/JP2017/035395
§ 371 (c)(1),
(2) Date: Mar. 11, 2020

(87) PCT Pub. No.: WO2019/064469
PCT Pub. Date: Apr. 4, 2019

(65) Prior Publication Data
US 2020/0292293 A1 Sep. 17, 2020

(51) Int. Cl.
G01B 7/004 (2006.01)
G01B 7/14 (2006.01)
F04D 29/058 (2006.01)
H02K 7/09 (2006.01)

(52) U.S. Cl.
CPC ............ G01B 7/144 (2013.01); F04D 29/058 (2013.01); G01B 7/004 (2013.01); H02K 7/09 (2013.01)

(58) Field of Classification Search
CPC ........... G01B 7/144; G01B 7/023; G01B 7/31
See application file for complete search history.

(56) References Cited

U.S. PATENT DOCUMENTS 4,044,580 A * 8/1977 Worden ................. B21B 38/10
33/657
6,404,088 B1 6/2002 Barada et al.
(Continued)

FOREIGN PATENT DOCUMENTS

JP 9-72336 A 3/1997
JP 2001-74049 A 3/2001
(Continued)

OTHER PUBLICATIONS

International Search Report (PCT/ISA/210) issued in PCT/JP2017/035395, dated Jan. 9, 2018.
(Continued)

Primary Examiner — George B Bennett
(74) Attorney, Agent, or Firm — Birch, Stewart, Kolasch & Birch, LLP

(57) ABSTRACT

Disclosed is a method for calibrating at least one gap sensor, the at least one gap sensor being provided on a magnetic bearing supporting a floating body in a non-contact manner by an electromagnetic force, the at least one gap sensor being configured to detect a gap between the floating body and a reference object that serves as a positional reference for position control of the floating body. The method includes: constructing a transformation formula for transforming an output of the at least one gap sensor into the gap using three or more constraints that are set as conditions for associating the gap with the output of the at least one gap sensor.

10 Claims, 14 Drawing Sheets

(56) References Cited

U.S. PATENT DOCUMENTS

| | | | | |
|---|---|---|---|---|
| 7,830,136 B2* | 11/2010 | Åkerblom | ............. | G01B 7/144 |
| | | | | 324/207.13 |
| 9,080,852 B2* | 7/2015 | Choi | ..................... | G01B 7/144 |
| 9,689,398 B2* | 6/2017 | Sakawaki | ............. | F04D 29/058 |
| 10,794,681 B2* | 10/2020 | Potter | ................... | G01B 7/003 |
| 11,002,566 B2* | 5/2021 | Hosek | .................... | G01D 5/145 |
| 2014/0363321 A1* | 12/2014 | Sakawaki | ............. | F04D 29/058 |
| | | | | 417/423.12 |
| 2019/0170151 A1* | 6/2019 | Sakawaki | ............. | F04D 19/048 |

FOREIGN PATENT DOCUMENTS

| | | |
|---|---|---|
| JP | 2014-228091 A | 12/2014 |
| JP | 2017-122672 A | 7/2017 |

OTHER PUBLICATIONS

Extended European Search Report, dated Feb. 25, 2021, for European Application No. 17926465.0.

* cited by examiner

METHOD FOR CALIBRATING GAP SENSOR

TECHNICAL FIELD

The present invention relates to a method for calibrating a gap sensor.

BACKGROUND ART

In order that a magnetic bearing supporting the shaft in a non-contact manner by electromagnetic forces controls the position of a shaft, the gap between the shaft and the magnetic bearing needs to be detected. For this reason, the magnetic bearing is generally provided with so-called gap sensors for the gap (see, for example, Patent Document 1).

CITATION LIST

Patent Document

PATENT DOCUMENT 1: Japanese Unexamined Patent Publication No. 2014-228091

SUMMARY OF THE INVENTION

Technical Problem

A nonlinear relationship is generally found between a value of an output signal from each of the gap sensors and the gap length, and varies among the sensors. In order that the magnetic bearing accurately controls the position of the shaft using the gap sensors to address the nonlinear relationship, any countermeasure needs to be taken. For example, a linearization circuit may be provided for each gap sensor.

However, the provision of such a linearization circuit leads to an increase in the cost of the magnetic bearing, and creates a need to calibrate the linearization circuit for each gap sensor. Such a calibrating operation of the linearization circuit is complicated.

In view of the foregoing background, it is therefore an object of the present invention to facilitate calibrating a gap sensor provided for a magnetic bearing.

Solution to the Problem

To solve the problem, a first aspect of the invention is directed to a method for calibrating at least one gap sensor (31, 32), the at least one gap sensor (31, 32) being provided on a magnetic bearing (21, 22) supporting a floating body (5) in a non-contact manner by an electromagnetic force, the at least one gap sensor (31, 32) being configured to detect a gap (g) between the floating body (5) and a reference object that serves as a positional reference for position control of the floating body (5). The method includes:
constructing a transformation formula for transforming an output of the at least one gap sensor (31, 32) into the gap (g), using three or more constraints that are set as conditions for associating the gap (g) with the output of the at least one gap sensor (31, 32).

According to this configuration, the at least one gap sensor (31, 32) of the magnetic bearing (21, 22) is calibrated based on the three or more constraints.

A second aspect of the invention is an embodiment of the first aspect of the invention. In the second aspect, the constructing includes: moving the floating body (5) along a predetermined trajectory; reading output signals from the gap sensors (31, 32) at a plurality of different positions on the trajectory; and setting, so as to construct the transformation formula, the three or more constraints by assigning the output signals read from the radial gap sensors (31, 32) to a geometric relational expression between the gap (g) and the trajectory, the geometric relational expression constraining the output signals of the radial gap sensors (31, 32).

According to this configuration, the three or more constraints are set based on the geometric relationship between the gap sensors (31, 32).

A third aspect of the invention is an embodiment of the second aspect of the invention. In the third aspect, the trajectory is a trajectory along which the floating body (5) is moved while being in contact with an auxiliary bearing (6, 7) that is in contact with, and supporting, the floating body (5) to prevent contact between the floating body (5) and the magnetic bearing (21, 22).

According to this configuration, the floating body (5) can be moved along an accurate trajectory.

A fourth aspect of the invention is an embodiment of the second aspect of the invention. In the fourth aspect, in the reading, an output of the at least one gap sensor (31, 32) is read at least at an upper or lower limit of a movable range of the floating body (5), and in the constructing, one of the constraints is set based on the upper or lower limit to construct the transformation formula.

According to this configuration, to set the constraints, the upper or lower limit of the movable range of the floating body (5) is used. Thus, this configuration can reduce the number of unknown parameters (described below) to be determined. Thus, this configuration simplifies an algorithm for determining the unknown parameters.

A fifth aspect of the invention is an embodiment of the first aspect of the invention. In the fifth aspect, the constructing includes: moving the floating body (5) along a trajectory passing through an upper or lower limit of a movable range of the floating body (5); reading an output of the at least one gap sensor (31, 32) when the floating body is at the upper or lower limit, using a position detection sensor configured to detect that the floating body is present at the upper or lower limit; and setting, so as to construct the transformation formula, the three or more constraints based on the read output of the at least one gap sensor and positional information on the upper or lower limit.

According to this configuration, to set the constraints, the position of the upper or lower limit in the movable range of the floating body (5) is detected by the position detection sensor. Thus, this configuration can also reduce the number of unknown parameters (described below) to be determined. Thus, this configuration simplifies an algorithm for determining the unknown parameters.

A sixth aspect of the invention is an embodiment of the fifth aspect of the invention. In the sixth aspect, in the constructing, another gap sensor (31, 32) except the gap sensor (31, 32) serving as a target for constructing the transformation formula is used as the position detection sensor to determine that the floating body (5) is present at the upper or lower limit, based on a fact that a value detected by the another gap sensor (31, 32) serving as the position detection sensor is a local maximum or a local minimum value.

According to this configuration, another gap sensor (31, 32) except the at least one gap sensor (31, 32) serving as a target for constructing the transformation formula is used as the position detection sensor.

A seventh aspect of the invention is an embodiment of the fifth aspect of the invention. In the seventh aspect, in the constructing, a current sensor (8) configured to detect a current of an electromagnet (71 to 78) of the magnetic bearing (21, 22) is used as the position detection sensor to superimpose a voltage having a predetermined amplitude on a voltage that moves the floating body (5) along the trajectory and determine that the floating body (5) is present at the upper or lower limit, based on a ratio between an amplitude of the superimposed voltage and an amplitude of the current detected by the position detection sensor.

According to this configuration, a current sensor (8) configured to detect a current flowing through a coil (65) of the electromagnet (71 to 78) is used as the position detection sensor.

An eighth aspect of the invention is an embodiment of the first aspect of the invention. In the eighth aspect, the constructing includes: moving the floating body (5) to a known initial position and applying a known force to the floating body (5) so as to move the floating body (5) at a known initial velocity; and setting the three or more constraints based on an equation of motion indicating a relationship between the known force and a position of the floating body (5).

According to this configuration, the three or more constraints are set based on the equation of motion related to the floating body (5).

A ninth aspect of the invention is an embodiment of the eighth aspect of the invention. In the ninth aspect, in the constructing, a highest position in a movable range of the floating body is used as the initial position, and gravity is used as the known force.

According to this configuration, the three or more constraints are set based on the equation of motion where the floating body (5) falls freely.

A tenth aspect of the invention is an embodiment of the eighth aspect of the invention. In the tenth aspect, in the constructing, an electromagnetic force of an electromagnet (71 to 78) of the magnetic bearing (21, 22) is applied, as the known force, to the floating body (5).

According to this configuration, the three or more constraints are set using the equation of motion based on the electromagnetic force acting on the floating body (5).

Advantages of the Invention

According to the first aspect, a gap sensor provided for a magnetic bearing can be easily calibrated.

According to the second aspect, a gap sensor provided for a magnetic bearing can be easily calibrated based on the geometric relationship between gap sensors.

According to the third aspect, a floating body can be accurately moved. This allows a gap sensor provided for a magnetic bearing to be easily and accurately calibrated.

According to the fourth to seventh aspects, an algorithm for determining unknown parameters is simplified. This allows a gap sensor provided for a magnetic bearing to be easily calibrated.

According to the eighth to tenth aspects, a gap sensor provided for a magnetic bearing can be easily calibrated based on the equation of motion related to the floating body (5).

DESCRIPTION OF EMBODIMENTS

Embodiments of the present invention will be described in detail below with reference to the drawings. The embodiments below are merely exemplary ones in nature, and are not intended to limit the scope, applications, or use of the present invention.

First Embodiment of Invention

Initially, a magnetic bearing apparatus provided for a compressor will now be described. Thereafter, calibration of a gap sensor provided for the magnetic bearing apparatus according to an embodiment of the present invention will be described. In the following description, "calibration of the gap sensor" means that a transformation formula for transforming the output of the gap sensor into a gap (described below) is constructed. The same statement applies to other embodiments below.

<Configuration of Compressor>

Figure 1:
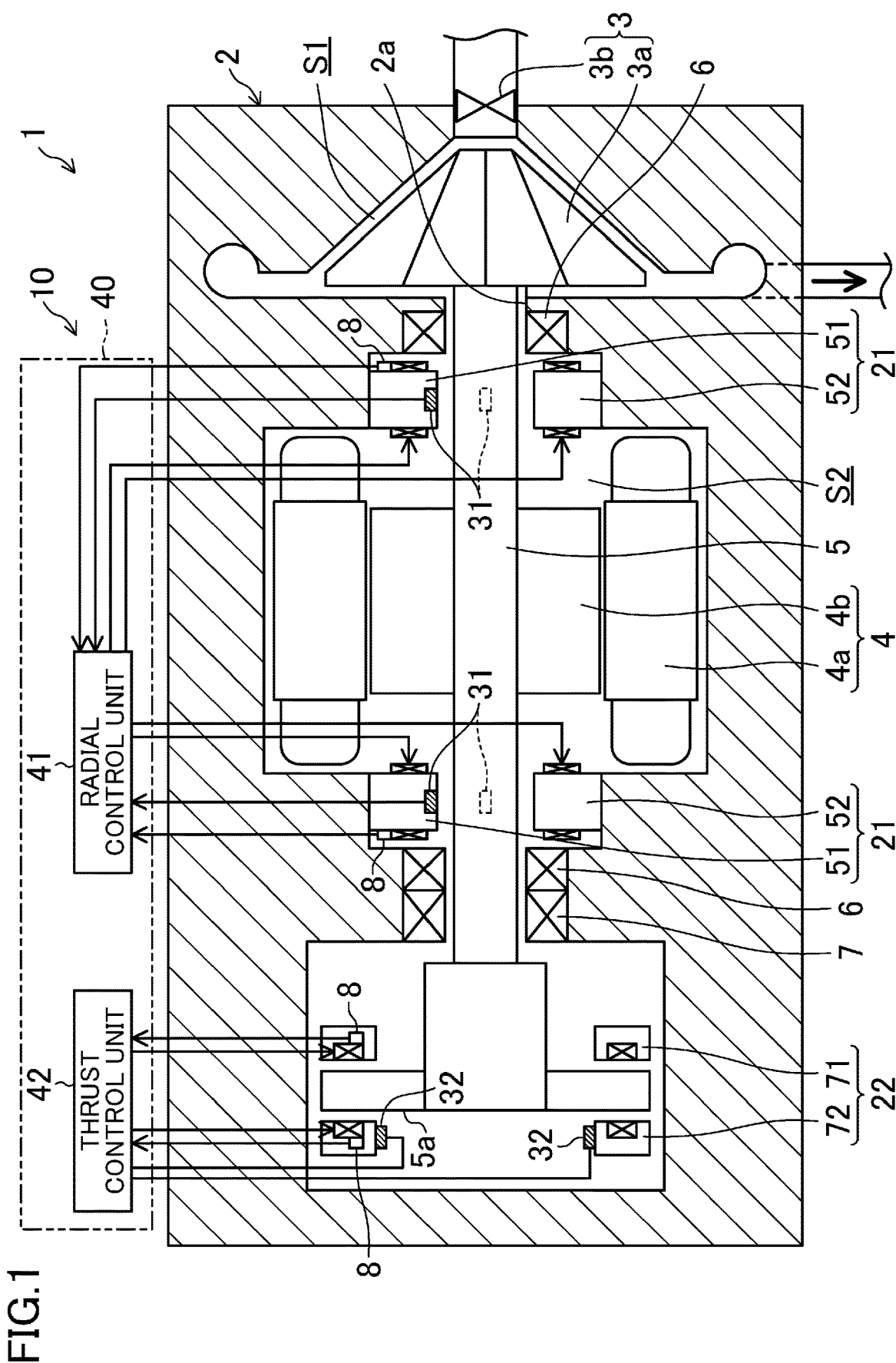
FIG. 1 illustrates an example configuration of a compressor according to a first embodiment.

FIG. 1 illustrates an example configuration of a compressor (1) according to a first embodiment. The compressor (1) is a so-called turbo compressor. As shown in FIG. 1, the compressor (1) includes a casing (2), a compression mechanism (3), an electric motor (4), a shaft (5), radial touchdown bearings (6), a thrust touchdown bearing (7), and a magnetic bearing apparatus (10).

—Compression Mechanism and Other Mechanisms—

The casing (2) is in the shape of a cylinder with both ends closed. The casing (2) is arranged such that its axial direction extends horizontally. The space in the casing (2) is partitioned by a wall (2a). The space on the right of the wall (2a) in the casing (2) constitutes a compression mechanism chamber (S1) for accommodating the compression mechanism (3). The space on the left of the wall (2a) in the casing (2) constitutes an electric motor chamber (S2) for accommodating the electric motor (4). The shaft (5) extending in the axial direction of the casing (2) connects the compression mechanism (3) to the electric motor (4). The shaft (5)

is an example of a floating body. In the following description, the shaft (5) may be referred to as the "floating body (5)."

The compression mechanism (3) is configured to compress a fluid (a refrigerant in this example). In this example, the compression mechanism (3) includes an impeller (3a) and an inlet guide vane (3b). The impeller (3a) has a plurality of blades, and thus has substantially a conical outer shape. The impeller (3a) is fixed to one end of the shaft (5). The inlet guide vane (3b) is a valve for controlling the amount of the fluid sucked. The inlet guide vane (3b) is provided at a fluid (refrigerant) inlet.

The electric motor (4) is configured to rotate the shaft (5). The electric motor (4) is configured as, for example, an interior permanent magnet (IPM) motor. More specifically, the electric motor (4) includes a stator (4a) and a rotor (4b). The stator (4a) is in the shape of a cylinder, and is fixed in the casing (2). The stator (4a) is provided with coils (4c) generating a rotating magnetic field. The rotor (4b) is in the shape of a column, and is rotatably arranged on the inner periphery of the stator (4a). The rotor (4b) is provided with a plurality of permanent magnets (not shown), which pass through the rotor (4b) in the axial direction. Examples of the permanent magnets include sintered magnets. A central portion of the rotor (4b) has a shaft hole. The shaft (5) is fixed into the shaft hole. The rotor (4b) and the shaft (5) are coaxial.

—Touchdown Bearing—

The compressor (1) is provided with two types of touchdown bearings, i.e., the radial touchdown bearings (6) and the thrust touchdown bearing (7). The radial touchdown bearings (6) and the thrust touchdown bearing (7) are configured to support the shaft (5) while the magnetic bearing apparatus (10) is not energized (i.e., while the shaft (5) is not floating). For example, the radial touchdown bearings (6) being in contact with, and supporting, the shaft (5) prevent the shaft (5) and the magnetic bearing apparatus (10) (properly speaking, the shaft (5) and a magnetic bearing core (61) of the radial magnetic bearing (21) described below) from coming into contact with each other. In other words, the radial touchdown bearings (6) are each an example of an auxiliary bearing. Likewise, while the magnetic bearing apparatus (10) is not energized, the thrust touchdown bearing (7) coming into contact with, and supporting, the shaft (5) prevents the shaft (5) and the magnetic bearing apparatus (10) (properly speaking, the magnetic bearing core (61) of a thrust magnetic bearing (22) described below) from coming into contact with each other. In other words, the thrust touchdown bearing (7) is also an example of an auxiliary bearing.

—Magnetic Bearing Apparatus—

The magnetic bearing apparatus (10) includes one or more (in this example, three) magnetic bearings. Specifically, the magnetic bearing apparatus (10) according to this embodiment includes two radial magnetic bearings (21) and one thrust magnetic bearing (22). The magnetic bearing apparatus (10) further includes one or more (in this example, ten) gap sensors (31, 32) and a controller (40).

The magnetic bearings (21, 22) of the magnetic bearing apparatus (10) each include a plurality of electromagnets. Each magnetic bearing (21, 22) is configured to support a supported object (the shaft portion of the shaft (5) and a disk portion (5a)) in a non-contact manner by a synthetic electromagnetic force (F) of the associated electromagnets. Controlling electric current flowing through the electromagnets of each of the magnetic bearings (21, 22) allows the position of the supported object to be controlled if a synthetic electromagnetic force (F) of these electromagnets is controlled. Thus, the magnetic bearing apparatus (10) is connected to a power source (not shown) for electromagnets. The power source is controlled by the controller (40). The radial magnetic bearings (21) and the thrust magnetic bearing (22) will now be described in detail.

—Radial Magnetic Bearing—

Figure 2:
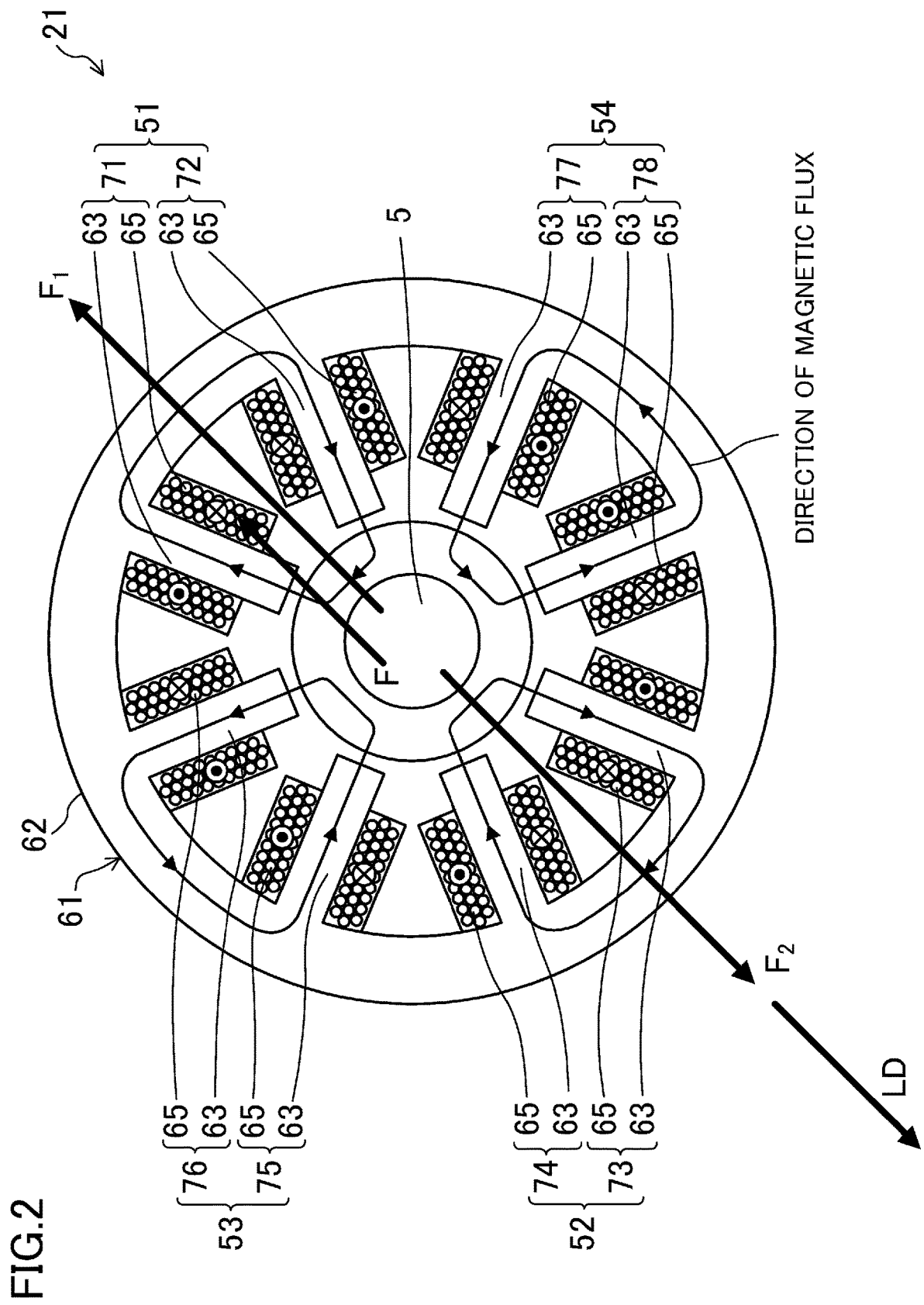
FIG. 2 is a transverse cross-sectional view illustrating an example configuration of a radial magnetic bearing.
Figure 3:
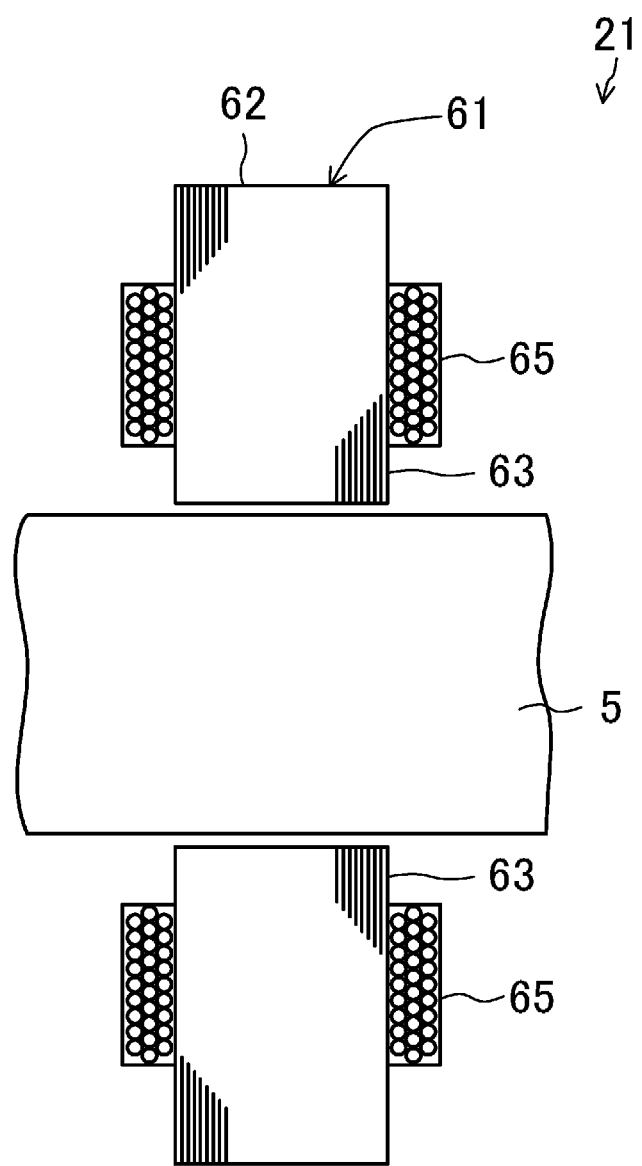
FIG. 3 is a longitudinal sectional view illustrating an example configuration of the radial magnetic bearing.

FIG. 2 is a transverse cross-sectional view illustrating an example configuration of a radial magnetic bearing (21). The transverse cross-sectional view illustrates a cross section orthogonal to the axis of the shaft (5). The same statement applies to the following description. FIG. 3 is a longitudinal sectional view illustrating an example configuration of the radial magnetic bearing (21). Here, the longitudinal sectional view illustrates a cross section parallel to the axis of the shaft (5). The same statement applies to the following description. The radial magnetic bearing (21) is a heteropolar radial magnetic bearing, and includes four electromagnet groups, i.e., first to fourth electromagnet groups (51 to 54). Each electromagnet group includes two electromagnets (71 to 78).

In this example, the radial magnetic bearing (21) includes a magnetic bearing core (61) and eight coils (65). The magnetic bearing core (61) includes a plurality of electromagnetic steel plates stacked, for example. The magnetic bearing core (61) includes a back yoke (62) and eight teeth (63). The back yoke (62) is in a cylindrical shape. The eight teeth (63) are arranged in the circumferential direction at predetermined intervals (45° in this example) along the inner peripheral surface of the back yoke (62). Each of the teeth (63) protrudes radially inward from the inner peripheral surface of the back yoke (62), and its inner peripheral surface (protruding surface) faces the outer peripheral surface of a supported portion (shaft portion) of the shaft (5) with a predetermined gap therebetween.

The eight coils (65) are each formed by winding a coated conductor around an associated one of the eight teeth (63) of the magnetic bearing core (61). Thus, the radial magnetic bearing (21) includes eight electromagnets (hereinafter referred to as "first to eighth electromagnets (71 to 78)"). Specifically, the first electromagnet (71), the second electromagnet (72), the seventh electromagnet (77), the eighth electromagnet (78), the third electromagnet (73), the fourth electromagnet (74), the fifth electromagnet (75), and the sixth electromagnet (76) are arranged in this order in the clockwise direction shown in FIG. 2.

In the radial magnetic bearing (21), the first to eighth electromagnets (71 to 78) generate an electromagnetic force to attract the supported portion (shaft portion) of the shaft (5). For further details, in the radial magnetic bearing (21), two of the first to eighth electromagnets (71 to 78) form one unit to form a magnetic flux. Here, a pair of the first and second electromagnets (71) and (72), a pair of the seventh and eighth electromagnets (77) and (78), a pair of the third and fourth electromagnets (73) and (74), and a pair of the fifth and sixth electromagnets (75) and (76) are respectively referred to as a "first electromagnet group (51)," a "fourth electromagnet group (54)," a "second electromagnet group (52)," and a "third electromagnet group (53)." In the radial magnetic bearing (21), each of the first to fourth electromagnet groups (51 to 54) as one unit forms a magnetic flux. FIG. 2 illustrates the magnetic flux of the fourth electromagnet group (54). As can be seen from the magnetic fluxes shown in FIG. 2, each electromagnet group may be considered as one electromagnet. Specifically, such magnetic fluxes can be each obtained by appropriately determining the winding direction of the associated coils (65) forming part of the first to eighth electromagnets (71 to 78) and the flow direction of the electric current flowing through the associated coils (65).

Further, in the radial magnetic bearing (21), as can be seen from FIG. 2, the first and second electromagnet groups (51, 52) face each other with the supported portion (shaft portion) of the shaft (5) interposed therebetween, and are configured to support the supported portion of the shaft (5) in a non-contact manner by their synthetic electromagnetic force (F). The third and fourth electromagnet groups (53, 54) also face each other with the supported portion (shaft portion) of the shaft (5) interposed therebetween, and are configured to support the supported portion of the shaft (5) in a non-contact manner by their synthetic electromagnetic force (F). The direction in which the third and fourth electromagnet groups (53, 54) face each other (i.e., a rightward and downward direction in FIG. 2) is orthogonal to the direction in which the first and second electromagnet groups (51, 52) face each other (a rightward and upward direction in FIG. 2) in a plan view.

—Thrust Magnetic Bearing—

Figure 4:
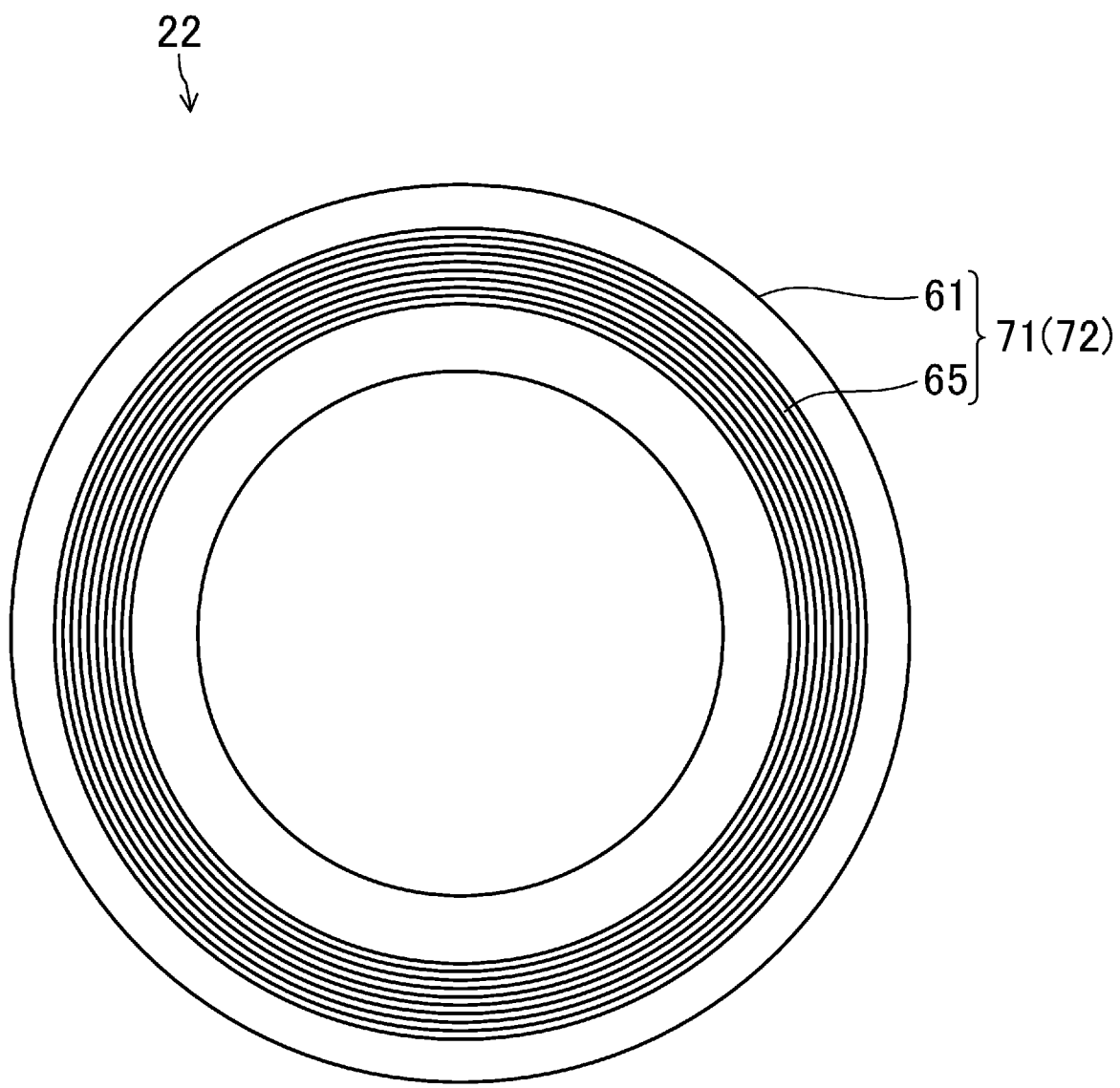
FIG. 4 is a plan view illustrating an example configuration of a thrust magnetic bearing.
Figure 5:
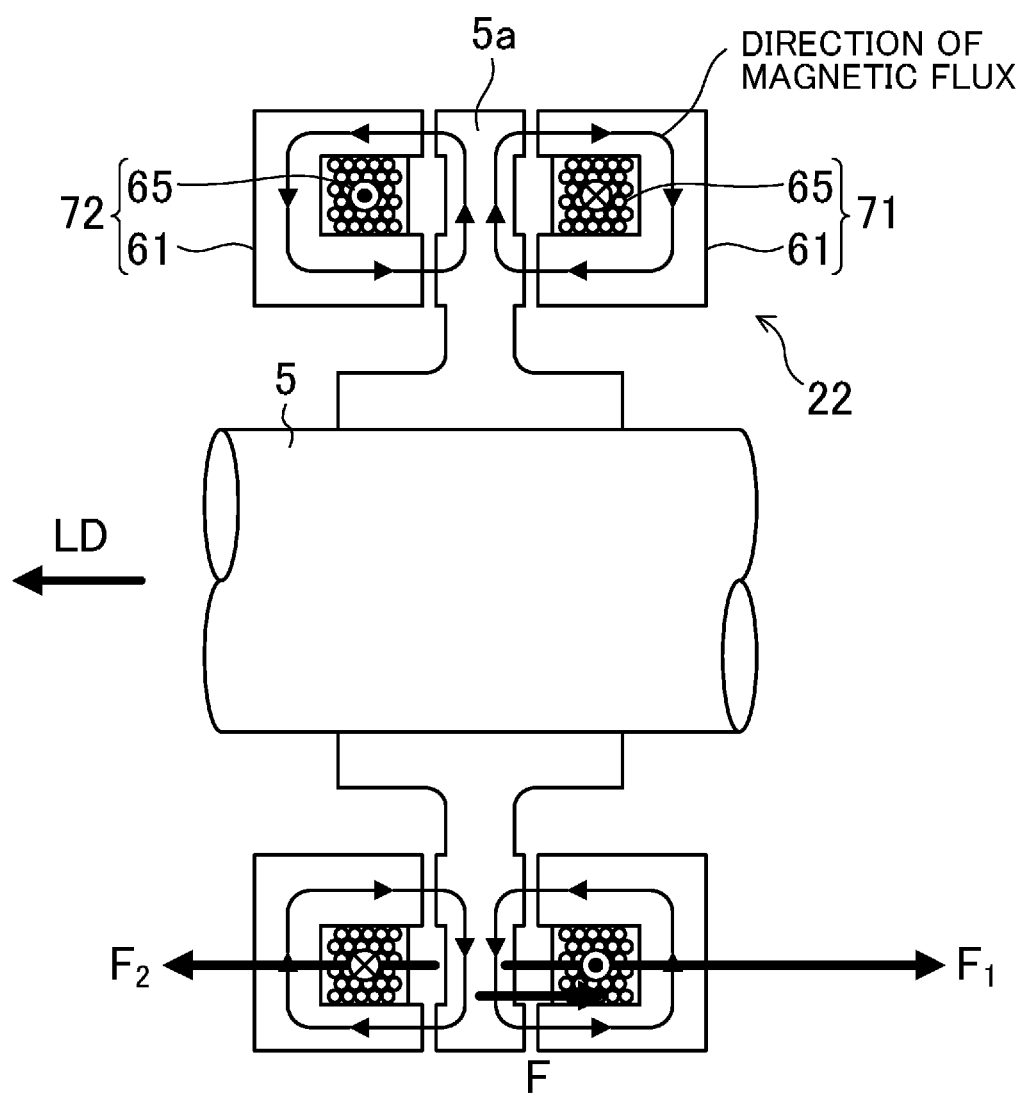
FIG. 5 is a longitudinal sectional view illustrating an example configuration of the thrust magnetic bearing.

FIG. 4 is a plan view illustrating an example configuration of the thrust magnetic bearing (22). FIG. 5 is a longitudinal sectional view illustrating an example configuration of the thrust magnetic bearing (22). As shown in FIGS. 4 and 5, the thrust magnetic bearing (22) includes a first electromagnet (71) and a second electromagnet (72). The other end of the shaft (5) of this embodiment (an end remote from the one end fixed to the impeller (3a)) has a disk-shaped portion (hereinafter referred to as the "disk portion (5a)"). The disk portion (5a) is a portion on which the electromagnetic force of the thrust magnetic bearing (22) acts. That is to say, the disk portion (5a) is the supported portion of the shaft (5). In the thrust magnetic bearing (22), the first and second electromagnets (71) and (72) face each other with the supported portion of the shaft (5), i.e., the disk portion (5a), interposed therebetween, and support the supported portion (disk portion (5a)) of the shaft (5) in a non-contact manner by their synthetic electromagnetic force (F). A specific configuration of the thrust magnetic bearing (22) will now be described.

Specifically, the thrust magnetic bearing (22) according to this embodiment includes two magnetic bearing cores (61) and two coils (65). Each of the two magnetic bearing cores (61) is formed into a ring-like shape. The magnetic bearing cores (61) are respectively arranged on both axial sides of the supported portion (disk portion (5a)) of the shaft (5) with a predetermined gap therebetween. A circumferential groove is formed over the entire periphery of an end face of each magnetic bearing core (61). The two coils (65) are housed in the circumferential grooves of the two magnetic bearing cores (61), respectively. Thus, the thrust magnetic bearing (22) includes two electromagnets (hereinafter referred to as the "first and second electromagnets (71, 72)").

The thrust magnetic bearing (22) including the first and second electromagnets (71, 72) as described above can control the electric current flowing through the coils (65) of the first and second electromagnets (71, 72) and thus can control the synthetic electromagnetic force (F) of these electromagnets (71, 72). If the synthetic electromagnetic force (F) of the first and second electromagnets (71, 72) can be controlled, the position of the supported portion (disk portion (5a)) of the shaft (5) in the direction in which the first and second electromagnets (71, 72) face each other (i.e., the axial direction of the shaft (5), the lateral direction in FIG. 5) can be controlled. In this embodiment, the winding direction of the coils (65) and the flow direction of the electric current flowing through the coils (65) are set to generate magnetic fluxes in the directions of the arrows shown in FIG. 5.

—Gap Sensor—

As shown in FIG. 1, the compressor (1) includes two types of displacement sensors, i.e., radial gap sensors (31) and thrust gap sensors (32). In this example, the radial gap sensors (31) and the thrust gap sensors (32) are both eddy-current displacement sensors. Each gap sensor (31, 32) is configured to detect the gap (g) between the associated supported portion of the shaft (5) and the associated touchdown bearing (6, 7). For example, as described below in detail, the radial gap sensors (31) are provided to correspond to an associated pair of electromagnet groups (for example, an associated pair of the first and second electromagnet groups (51, 52)) facing each other with the supported object (the shaft portion which is the supported portion of the shaft (5) in this example) interposed therebetween.

—Radial Gap Sensor (31)—

In this example, four of the radial gap sensors (31) are provided for each radial magnetic bearing (21). In other words, the number of the radial gap sensors (31) provided for the compressor (1) is eight. These gap sensors (31) are each configured to detect the gap (g) between the associated radial touchdown bearing (6) and the supported portion (shaft portion) of the shaft (5). This radial touchdown bearing (6) is a reference object that serves as a positional reference for the position control of the floating body (5) (synonymous with levitation control described below). In this example, two of the radial gap sensors (31) facing each other are arranged on portions of each radial magnetic bearing (21) facing each other with the shaft (5) interposed therebetween (in detail, symmetric portions). This arrangement allows these two radial gap sensors (31) to each detect the gap (g) in the direction in which the first and second electromagnet groups (51) and (52) face each other (hereinafter referred to as the "X direction"). Here, the X direction is a radial direction of the radial magnetic bearing (21), and corresponds to the rightward and upward direction in FIG. 2. The remaining two radial gap sensors (31) are arranged at positions facing each other (in detail, symmetric positions) with the shaft (5) interposed therebetween. These two radial gap sensors (31) each detect the gap (g) in the direction in which the third and fourth electromagnet groups (53) and (54) face each other (i.e., the radial direction, hereinafter referred to as the "Y direction," which is orthogonal to the X direction and is the rightward and downward direction in FIG. 2).

—Thrust Gap Sensor (32)—

The compressor (1) includes two thrust gap sensors (32). These thrust gap sensors (32) detect the gap (g) between the thrust touchdown bearing (7) and a surface of the disk portion (5a). The thrust touchdown bearing (7) is a reference object that serves as a positional reference for the position control of the floating body (5) (synonymous with the levitation control described below). To detect the gap (g), these thrust gap sensors (32) are arranged in this example such that their gap sensor axis (described below) is directed in the direction in which the first and second electromagnets (71, 72) of the thrust magnetic bearing (22) face each other (i.e., the axial direction of the shaft (5) (hereinafter referred to as the "Z direction") which is the lateral direction in FIG. 5). More specifically, these thrust gap sensors (32) are arranged to face one surface (i.e., the same surface) of the disk portion (5a) (supported portion) of the shaft (5). These thrust gap sensors (32) are arranged so as to be symmetric with respect to the shaft (5).

—Controller—

The controller (40) includes a microcomputer, a memory device storing software for operating the microcomputer, and other components. The controller (40) controls one or more magnetic bearings (21, 22) so that the supported body (in this example, the supported portion of the shaft (5)) is supported in a non-contact manner. More specifically, the controller (40) controls the position of the shaft (5) (hereinafter referred to as "levitation control") by controlling the electromagnetic force(s) of the one or more magnetic bearings (21, 22). To achieve this levitation control, the controller (40) of this embodiment includes a radial control unit (41) for performing levitation control of the two radial magnetic bearings (21), and a thrust control unit (42) for performing levitation control of the thrust magnetic bearing (22).

To perform the levitation control, the magnitude of the electric current flowing through each of the coils (65) of the first to eighth electromagnets (71 to 78) needs to be grasped. To satisfy the need, the magnetic bearing apparatus (10) includes current sensors (8) each configured to detect the magnitude of the electric current flowing through the coils (65) of an associated one of the radial magnetic bearings (21) and the thrust magnetic bearing (22) (see FIG. 1).

—Radial Control Unit (41)—

The radial control unit (41) performs levitation control of the shaft (5) in the X and Y directions. Specifically, under the levitation control, the radial control unit (41) allows electric current (control current (id)) to flow through each of the coils (65) forming part of the first to fourth electromagnet groups (51 to 54) such that the difference (e) between the gap (g) between the shaft (5) and the associated radial touchdown bearing (6) and a predetermined command value (g*) converges to zero in an associated one of the X and Y directions. In the magnetic bearing apparatus (10) of this embodiment, the electric current that has passed through the coil (65) can be detected by the associated current sensor (8).

In this levitation control, the gap (g) from the shaft (5) (shaft portion) needs to be determined. Specifically, to determine the gap (g), the output signal (for example, voltage or current) of the associated radial gap sensor (31) needs to be transformed into the gap (g). However, a non-linear relationship is generally found between the intensity of the output signal (hereinafter referred to as the "output signal (v)") of the radial gap sensor (31) and the gap (g). Thus, an accurate gap (g) can be determined only after the output signal of the radial gap sensor (31) is subjected to any process. To address this problem, in this embodiment, a transformation formula for transforming the output signal (v) of the gap sensor into the gap (g) is determined in advance, and then the gap (g) is determined using the transformation formula during the levitation control. In general, the signal that has just been output from each of the gap sensors (31, 32) is amplified by an amplifier (see sensor amplifiers shown in FIG. 6 and described below) and is then used for the levitation control. In the present description, the signal that has been amplified by the amplifier will be referred to as the "output signal (v)" of the gap sensor (31, 32).

Figure 6:
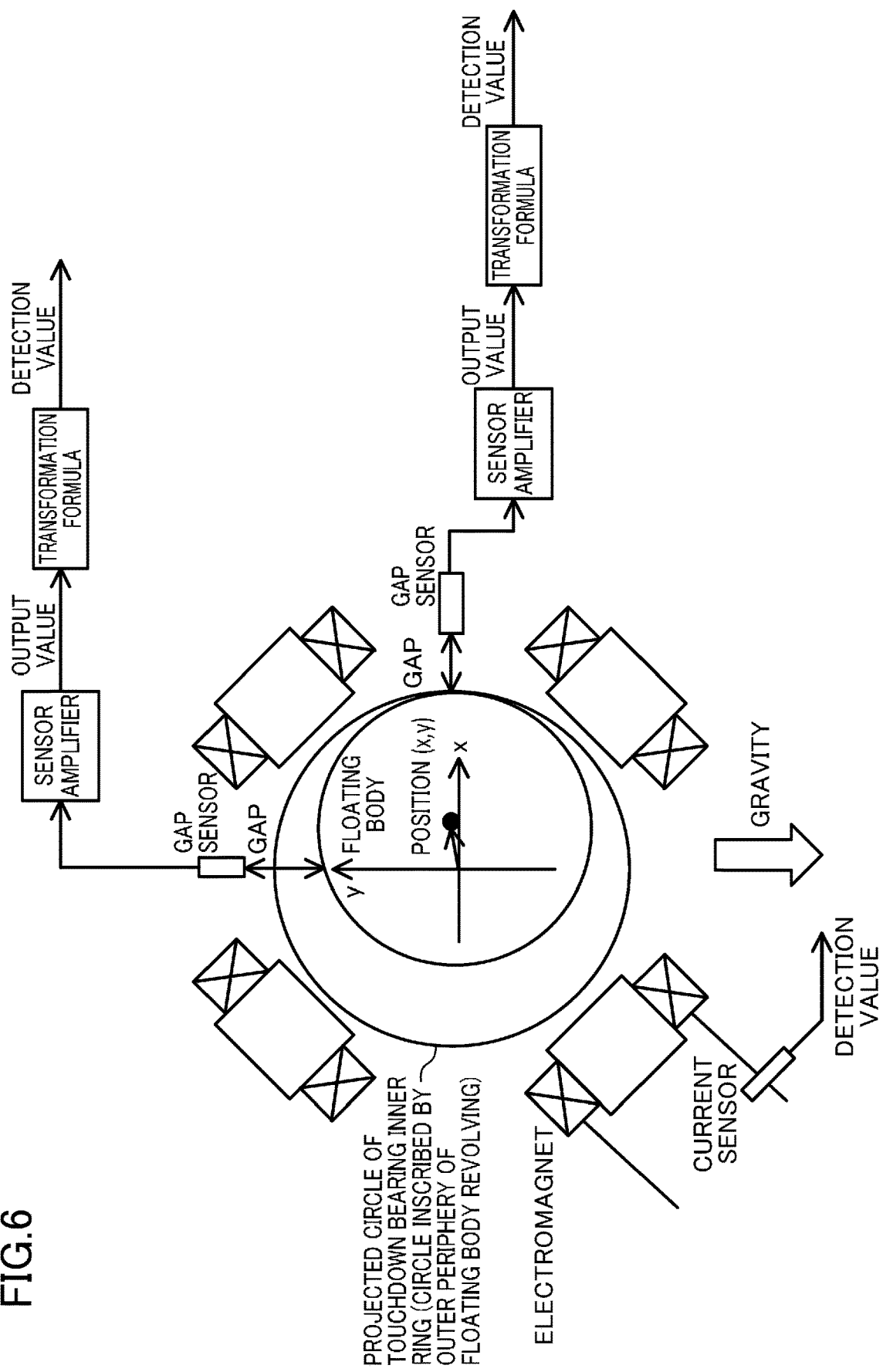
FIG. 6 shows a concept of position control performed by the radial magnetic bearing.

FIG. 6 shows a concept of position control performed by a radial magnetic bearing (21). As shown in this figure, in this embodiment, the output signal (v) of each radial gap sensor (31) is transformed using a predetermined transformation formula, and the transformation result is treated as the gap (g) in the levitation control. Such a transformation formula is a formula where a non-linear relationship is found. For example, the relationship between the intensity of the output signal (v) of the radial gap sensor (31) and the gap (g) may be approximated by a quadratic expression.

The non-linear relationship varies among the radial gap sensors (31). In other words, the relationship between the intensity of the output signal (v) and the gap (g) varies among the individual radial gap sensors (31). For this reason, for example, if the gap (g) is determined using the transformation formula common to all the radial gap sensors (31), the accurate position of the shaft (5) cannot be grasped. This prevents accurate levitation control from being performed. To address this problem, in this embodiment, the transformation formula is constructed for each radial gap sensor (31). In other words, "calibration of each gap sensor" is performed. The principle and procedure of this calibration will be described in detail below.

—Thrust Control Unit (42)—

The thrust control unit (42) performs levitation control of the shaft (5) in the Z direction. Specifically, under the levitation control, the thrust control unit (42) allows electric current (control current (id)) to flow through each coil (65) forming part of an associated one of the first and second electromagnet groups (71, 72) such that the difference (e) between the gap (g) between the shaft (5) and the associated thrust gap sensor (32) and a predetermined command value (g*) converges to zero in the Z direction. The magnitude of the electric current that has flowed through the coil (65) of each of the first and second electromagnets (71, 72) can be detected by the associated current sensor (8).

In the thrust magnetic bearing (22), too, the gap (g) of the shaft (5) needs to be determined in levitation control. Specifically, the output signal (for example, voltage or current) of each of the thrust gap sensors (32) for the thrust magnetic bearing (22) also needs to be transformed into the gap (g). A non-linear relationship is found between the intensity of the output signal (hereinafter referred to as the "output signal (v)") of the thrust gap sensor (32) and the gap (g), just like the radial gap sensors (31). For example, the relationship between the intensity of the output signal (v) of the thrust gap sensor (32) and the gap (g) may also be approximated by a quadratic expression.

The non-linear relationship varies between the thrust gap sensors (32). In other words, the relationship between the intensity of the output signal (v) and the gap (g) varies between the individual thrust gap sensors (32). For this reason, for example, if the gap (g) is determined using the transformation formula common to all the radial gap sensors (31), the accurate position of the shaft (5) (more specifically, the disk portion (5a)) cannot be grasped. This prevents accurate levitation control from being performed. To address this problem, in this embodiment, a transformation formula for transforming the output signal (v) of each thrust gap sensor (32) into the gap (g) is constructed (i.e., "calibration of the gap sensor" is performed) in advance, and then the gap (g) is determined using the transformation formula during the levitation control.

<Calibration of Gap Sensor>

—Outline—

A method for calibrating a radial gap sensor (31) as a representative will now be described. In this embodiment, three or more constraints are set to associate the gap (g) at the radial gap sensor (31) with the output signal (v) of the radial gap sensor (31). Then, a transformation formula for transforming the output signal (v) of the radial gap sensor (31) into the gap (g) is constructed using these constraints. More specifically, according to this embodiment, the shaft portion of the shaft (5) (hereinafter referred to also as the "floating body (5)") is first moved along a predetermined trajectory. In addition, while the shaft portion is being moved, the three or more constraints (specifically, formulae (8') described below) are set by assigning the values of the output signals (v) read from the radial gap sensors (31) to a geometric relational expression between the gap (g) and the trajectory. The geometric relational expression constrains the output signals of the radial gap sensors (31). Finally, the transformation formula is constructed using the constraints.

—Principle of Calibration—

The principle of calibration will be described below with reference to an example in which two radial gap sensors (31) are calibrated at the same time. In the following description, for convenience of description, one of the radial gap sensors (31) is referred to as the "gap sensor (i)," and the other radial gap sensor (31) is referred to as the "gap sensor (j)." Output signals (here, corresponding to the detected voltage) from the gap sensors (i, j) are respectively referred to as the "output signals ($v_i$) and ($v_j$)." The detected values of the gaps (g) corresponding to the gap sensors (i) and (j) (i.e., the values each determined using the associated transformation formula) are respectively gap detection values ($g_i\hat{}$) and ($g_j\hat{}$).

In addition, in this embodiment, the transformation formulae for transforming the output signals ($v_i$, $v_j$) into the gap detection values ($g_i\hat{}$, $g_j\hat{}$), respectively, are defined as the following formulae (1') and (2'). In other words, in this embodiment, the non-linear relationship of each radial gap sensor (31) is approximated by a quadratic expression (see formulae (1') and (2')).

$$g_i\hat{} = f_i(p_i, v_i) \tag{1}$$

$$= a_i \times v_i^2 + b_i \times v_i + c_i \tag{1'}$$

$$g_j\hat{} = f_j(p_j, v_j) \tag{2}$$

$$= a_j \times v_j^2 + b_j \times v_j + c_j \tag{2'}$$

wherein $f_i(p_i, v_i)$ in the formula (1) and $f_j(p_j, v_j)$ in the formula (2) are each a structure of the function of the associated transformation formula; $p_i=(a_i, b_i, c_i)$ and $p_j=(a_j, b_j, c_j)$ are each a constant in the associated transformation formula; and $p_i=(a_i, b_i, c_i)$ and $p_j=(a_j, b_j, c_j)$ are each a parameter (hereinafter referred to as the "unknown parameter") that should be determined by "calibration" of the associated gap sensor (i, j).

Figure 7:
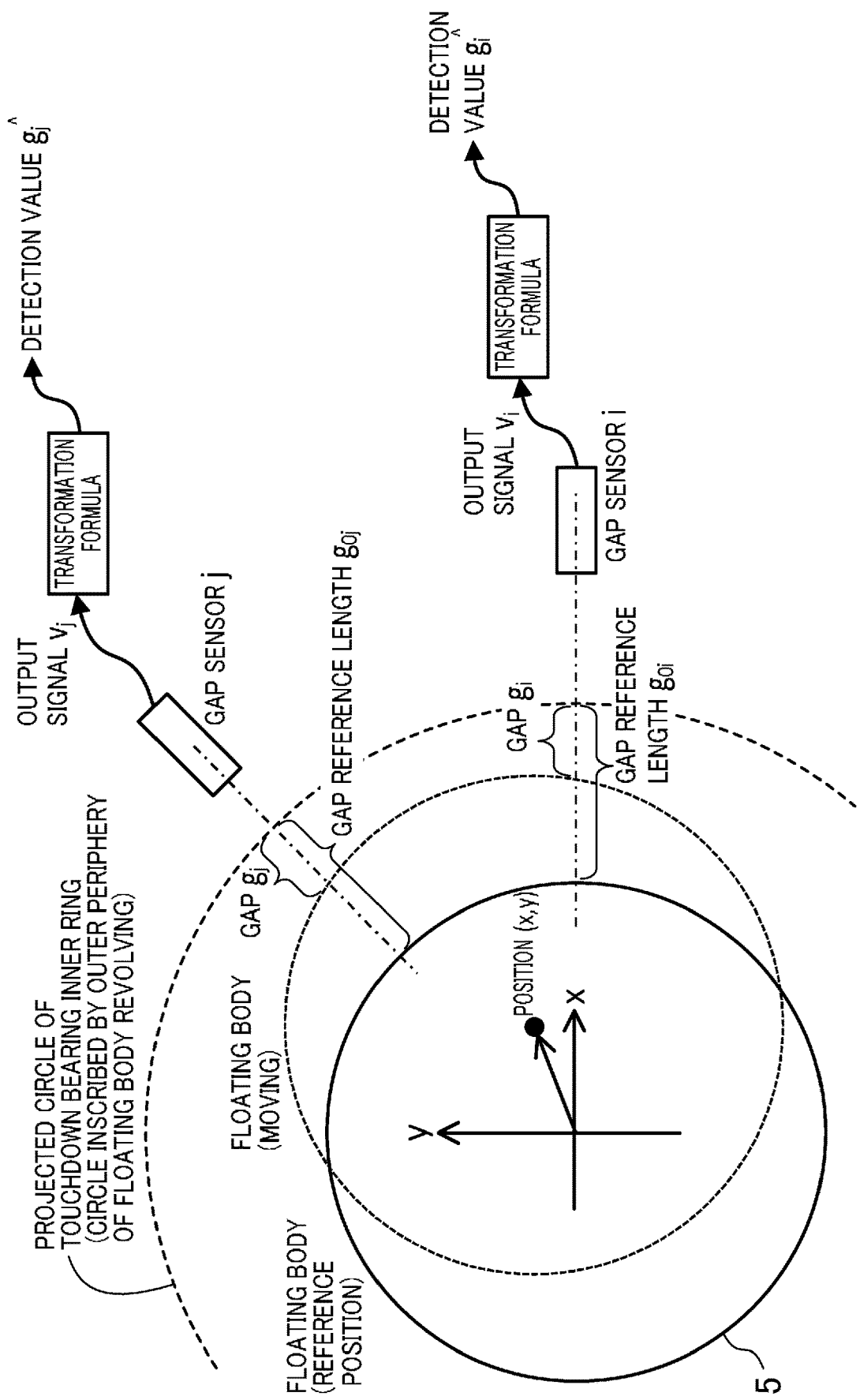
FIG. 7 shows the positional relationship between a shaft portion of a shaft (i.e., a floating body) and each of gap sensors.

FIG. 7 shows the positional relationship between the shaft portion of the shaft (5) (i.e., a floating body) and each gap sensor (i,j). Here, the reference position (x=y=0) of the floating body (5) means that the axis of the floating body (5) is located at the axis (center) of the radial touchdown bearings (6). The "gap reference length" means the gap (g) formed when the floating body (5) is located at a predetermined reference position. The "reference position" in this embodiment is a position at which the axis of the shaft (5) coincides with the axis of the radial touchdown bearings (6). Naturally, the "reference position" in this example is merely a non-limiting example. The "reference position" merely needs to be any known position (coordinate), and the coordinate of the position may be defined as x=y=0.

Figure 8:
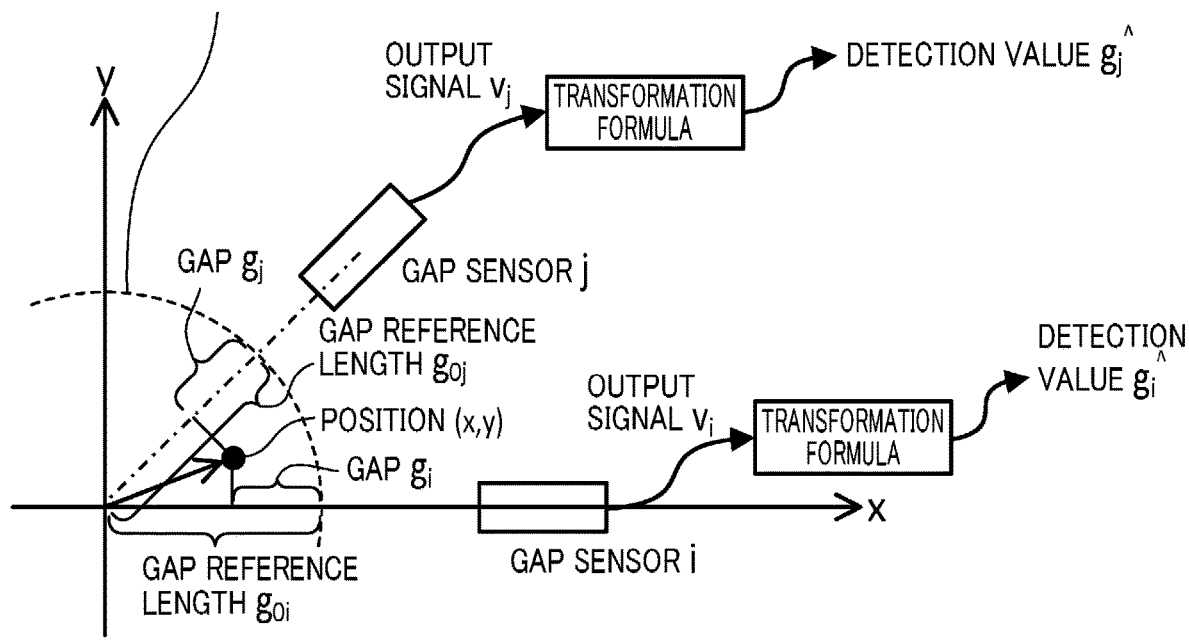
FIG. 8 shows a state where a position vector of the shaft (i.e., the floating body) is translated to the point of intersection of the gap sensor axis and the periphery of the floating body at a reference position.
Figure 9:
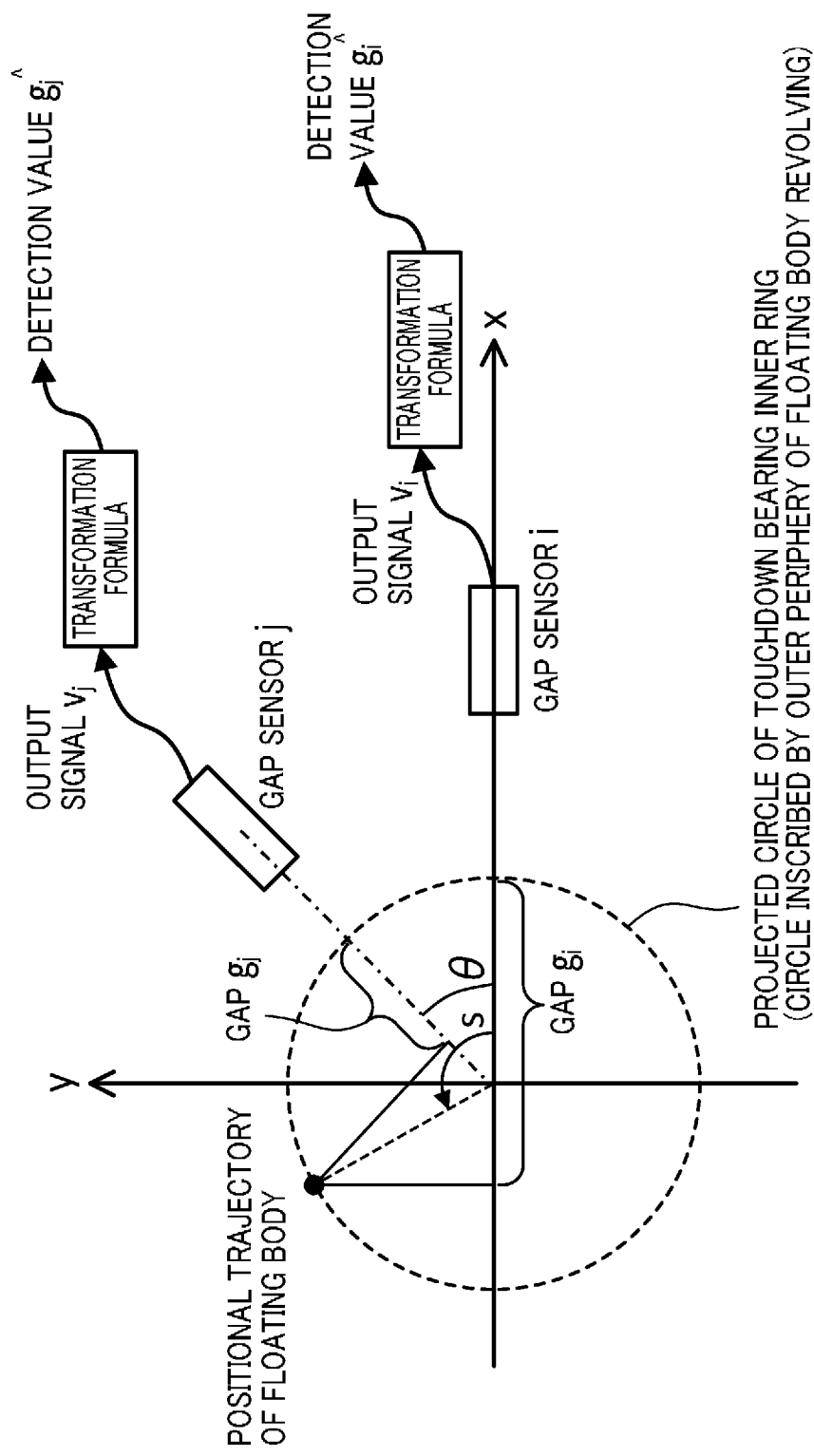
FIG. 9 shows the positional (geometric) relationship between two gap sensors.

FIG. 8 shows a state where a position vector of the floating body (5) is translated to the point of intersection of the periphery of the floating body (5) at the reference position and the gap sensor axis. Generally, the gap sensors (31, 32) have directivity with respect to the detection sensitivity of the gap. Here, a straight line parallel to the direction in which the directivity of the detection sensitivity becomes maximum and passing through the center of the surfaces of the gap sensors (31, 32) facing the target is defined as the "gap sensor axis." In general, the diameter of the floating body (5) is sufficiently larger than the gap (g). Thus, approximately, as shown in FIG. 8, after a position vector of the floating body (5) is translated to the point of intersection of the periphery of the floating body (5) at the reference position and the gap sensor axis, a vector is obtained by projecting the position vector of the floating body (5) onto the gap sensor axis. The thus-obtained vector is the difference (change vector) between the gap reference length and the gap length. FIG. 9 shows the positional relationship (i.e., the geometric relationship) between the two gap sensors (i, j). Here, as shown in FIG. 9, the gap sensor (i) is provided to detect the gap (g) in the X-axis direction. The gap sensor (j) is placed at a position that would be reached if the gap sensor (i) rotated around the Z-axis (orthogonal to the X- and Y-axes) at an angle θ from the X-axis.

The trajectory along which the floating body (5) moves in the radial magnetic bearings (21) can be expressed using predetermined parameters (s). For example, if the floating body (5) is revolved along the inner peripheries of the radial touchdown bearings (6), the trajectory of the floating body (5) forms a circumference as shown in FIG. 9. The angle of a position on the circumference (coordinate) from the X-axis can be represented as a parameter (s). Thus, the geometric relationship among the actual gap ($g_i$) at the gap sensor (i), the actual gap ($g_j$) at the gap sensor (j), and the trajectory (x(s), y(s)) of the center (here, the axis) of the floating body (5) can be expressed as the following formulae.

$$g_i = g_{0i} - e_i^T [x(s)\ y(s)]^T \tag{3}$$

$$= g_{0i} - [1\ 0][\cos(s)\ \sin(s)]^T$$

$$= g_{0i} - \cos(s) \tag{3'}$$

$$g_j = g_{0j} - e_j^T [x(s)\ y(s)]^T \tag{4}$$

$$= g_{0j} - [\cos\theta\ \sin\theta][\cos(s)\ \sin(s)]^T$$

$$= g_{0j} - \cos(s)\cos\theta - \sin(s)\sin\theta \tag{4'}$$

where T represents a transposed matrix, and $g_{0i}$ is the gap reference length at the gap sensor (i), and similarly, $g_{0j}$ is the gap reference length at the gap sensor (j). Further, $e_i$ is a unit vector directed from the origin of the coordinate system shown in FIG. 9 toward the gap sensor (i) (see FIGS. 8 and 9). In addition, $e_j$ is a unit vector directed from the origin of the coordinate system shown in FIG. 9 toward the gap sensor (j). Here, suppose that the gap detection values ($g_i\hat{}$, $g_j\hat{}$) of the gap sensors (i, j) correspond to the gaps ($g_i$, $g_j$) (i.e., $g_i\hat{}=g_i$, $g_j\hat{}=g_j$). In that case, combining the formulae (1) to (4) together provides the following formula (5).

[Formula 1]

$$\begin{bmatrix} f_i(p_i, v_i) \\ f_j(p_j, v_j) \end{bmatrix} = \begin{bmatrix} g_{0i} \\ g_{0j} \end{bmatrix} - \begin{bmatrix} e_i^T \\ e_j^T \end{bmatrix} \begin{bmatrix} x(s) \\ y(s) \end{bmatrix} \tag{5}$$

In particular, in this embodiment, the trajectory of the floating body (5) forms a circumference. Thus, the formula (5) can be rewritten as follows.

[Formula 2]

$$\begin{bmatrix} a_i v_i^2 + b_i v_i + c_i \\ a_j v_j^2 + b_j v_j + c_j \end{bmatrix} = \begin{bmatrix} g_{0i} \\ g_{0j} \end{bmatrix} - \begin{bmatrix} 1 & 0 \\ \cos\theta & \sin\theta \end{bmatrix} \begin{bmatrix} \cos(s) \\ \sin(s) \end{bmatrix} \quad (5')$$

Here, the parameters (s) are eliminated from the formula (5'). Specifically, first, solving cos(s) and sin(s) in the formula (5') provides the following formula (6').

[Formula 3]

$$\begin{bmatrix} \cos(s) \\ \sin(s) \end{bmatrix} = \begin{bmatrix} 1 & 0 \\ \cos\theta & \sin\theta \end{bmatrix}^{-1} \begin{bmatrix} -a_i v_i^2 - b_i v_i - c_i + g_{0i} \\ -a_j v_j^2 - b_j v_j - c_j + g_{0j} \end{bmatrix} = \begin{bmatrix} -a_i v_i^2 - b_i v_i - c_i + g_{0i} \\ \dfrac{a_i v_i^2 + b_i v_i + c_i -}{\tan\theta} - \dfrac{a_j v_j^2 + b_j v_j + c_j - g_{0j}}{\sin\theta} \end{bmatrix} \quad (6')$$

Eliminating the parameters (s) from the formula (6') using $\cos^2(s)+\sin^2(s)=1$ can provide the following equation.

$$h(a_i,b_i,c_i,a_j,b_j,c_j,v_i(t),v_j(t))=0 \quad (7')$$

The left side of this equation is a quadratic polynomial with six elements such as unknown parameters $a_i$, $b_i$, $c_i$, $a_j$, $b_j$, and $c_j$. The constants of the terms are numeric values determined by the output signals $v_i(t)$, $v_j(t)$ from the gap sensors (i,j) at every moment, or numeric values that do not explicitly depend on time. More generally, the following equation (formula (7)) can be obtained. The left side of this equation can also be expanded into a polynomial.

$$h(p_i,p_j,v_i(t),v_3(t))=0 \quad (7)$$

As can be seen from the foregoing description, if the structure of the transformation formula for transforming the output signals ($v_i$, $v_j$) of the gap sensors (i, j) into the gap (g), the arrangement of the gap sensors (i, j), and the trajectory of the floating body (5) are determined, the relationship between the constants of the formula (7) and the output signals ($v_i$, $v_j$) of the gap sensors (i, j) is also determined. In this embodiment, obtaining the output signals ($v_i$, $v_j$) of the gap sensors (i, j) at a plurality of times $t_1, \ldots, t_k, \ldots, t_N$ when the floating body (5) is located at different positions provides the following simultaneous equation (formula (8')). Solving this simultaneous equation allows the relationship between the constants of the formula (7) and the output signals ($v_i$, $v_j$) of the gap sensors (i, j) to be determined. To solve these simultaneous equations, the number of independent equations merely needs to be greater than the number of the unknown parameters.

$$h(a_i,b_i,c_i,a_j,b_j,c_j,v_i(t_1),v_j(t_1))=0$$

$$h(a_i,b_i,c_i,a_j,b_j,c_j,v_i(t_k),v_j(t_k))=0$$

$$h(a_i,b_i,c_i,a_j,b_j,c_j,v_i(t_N),v_j(t_N))=0 \quad (8')$$

To solve these simultaneous equations, for example, an optimization algorithm such as a genetic algorithm may be used with the norm of the N-dimensional vector represented by the combined left sides of the formulae (8') as an evaluation index. Specifically, the unknown parameters are specified by determining the unknown parameters through search such that the norm approaches zero. Naturally, the principle of this calibration can also be applied to the calibration of the thrust gap sensors (32).

A method for solving the simultaneous equations should not be limited to the genetic algorithm. For example, one of various methods such as a method of steepest descent and a Monte Carlo method can be used depending on the form of each equation. A plurality of combinations of a definition of the transformation formula and a way of moving the floating body (5) may be prepared, and the relationship between the constants of the formula (7) and the output signals ($v_i$, $v_j$) of the gap sensors (i, j) may be determined depending on each of the prepared combinations. The definition of the transformation formula used herein means determining a formula for use to approximate the non-linear relationship.

—Calibrating Procedure of this Embodiment—

Figure 10:
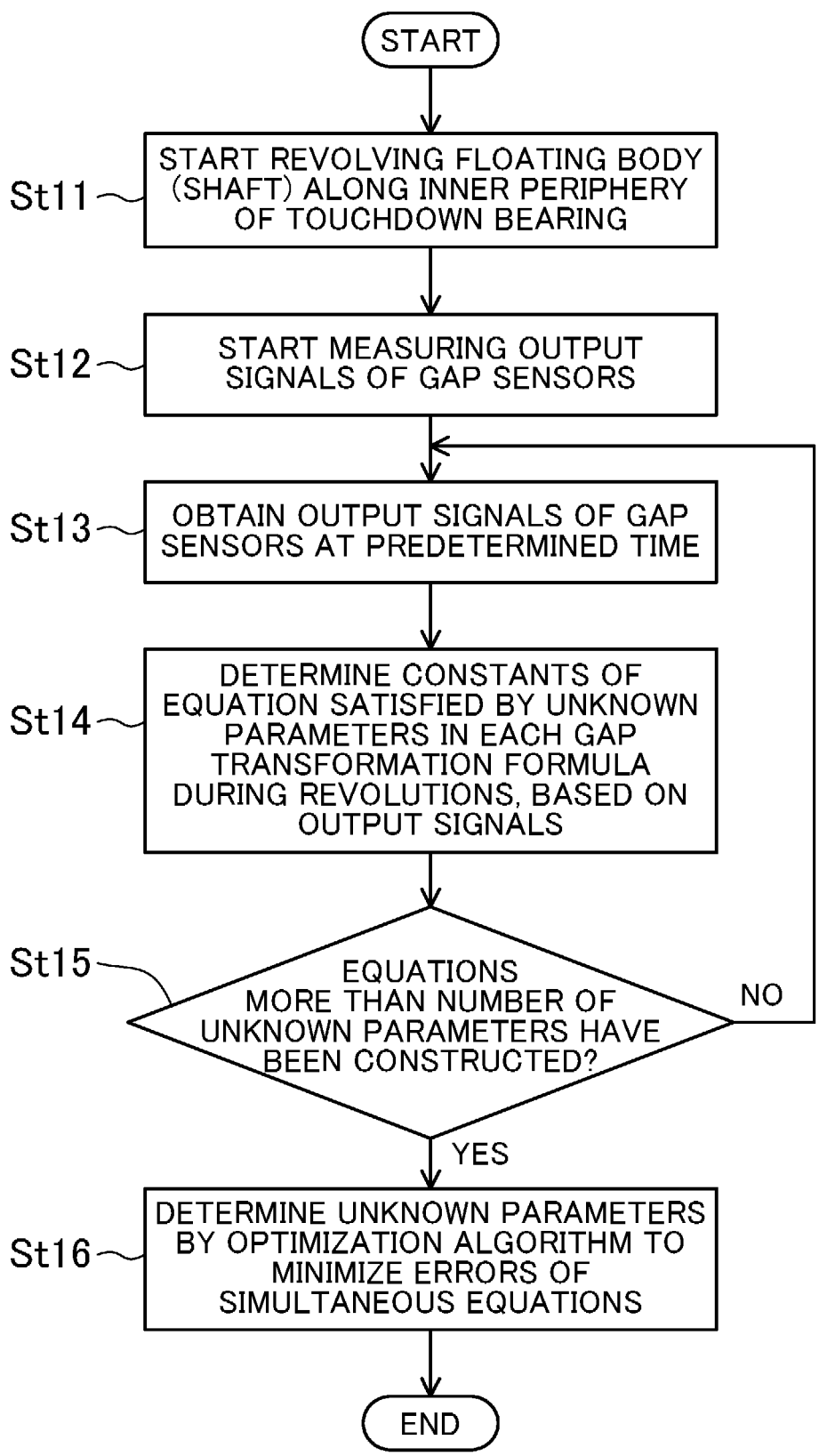
FIG. 10 is a flowchart showing a calibrating procedure according to the first embodiment.

An actual calibrating procedure based on the foregoing principle of calibration will be described using the radial gap sensors (31) as an example. This calibrating procedure may be partly or totally implemented, for example, in the form of a program incorporated in a separately prepared personal computer (hereinafter referred to as the "calibration apparatus" for convenience of description). FIG. 10 is a flowchart showing a calibrating procedure according to the first embodiment. An example in which two radial gap sensors (31) are calibrated will be described below. For description of the procedure, the same reference characters (such as $v_i$) as those used in the previous description of <Principle of Calibration> are assigned to the output signals and other components as necessary.

In Step (St11) in the flowchart, the shaft (5) (floating body) is moved along a predetermined trajectory. Specifically, sending a predetermined signal from the calibration apparatus to the controller (40) (specifically, the radial control unit (41)) causes the electromagnet groups (51 to 54) of each radial magnetic bearing (21) to press the shaft (5) against the radial touchdown bearings (6), and further causes gradual changes in the direction in which the shaft (5) is pressed. Thus, the outer peripheral surface of the shaft portion of the shaft (5) is brought into contact with the inner peripheral surfaces of the radial touchdown bearings (6), and the shaft (5) moves while changing the contact location. Specifically, in this embodiment, the contact location is changed such that the trajectory of the axis of the shaft (5) forms a circumference having a center coinciding with the axis of the radial touchdown bearings (6).

In Step (St12), the calibration apparatus determines a combination of a plurality of gap sensors including at least one radial gap sensor (31) serving as a target for calibration, and starts measuring the output signals (v) of the radial gap sensors (31). Combinations of the gap sensors are not limited. For example, a combination of a radial gap sensor (31) for the X direction and another radial gap sensor (31) for the Y direction may be used. At least one of the radial gap sensors (31) selected in this manner is a target for "calibration," i.e., a target for which a transformation formula is to be constructed.

In Step (St13), the output signals $v_i(t)$ and $v_j(t)$ at a predetermined time (t) from the radial gap sensors (31) selected in Step (St12) are obtained. The "(t)" assigned behind these variables indicates that the values of these variables are values at the time t. The same statement applies to other embodiments below. In Step (St14), the constants of one simultaneous equation (see the formulae (8')) are determined using the output signals ($v_i(t)$, $v_j(t)$) obtained in Step (St13). That is to say, one equation is constructed. In Step (St15), whether or not a number of formulae (equations)

large enough to solve the simultaneous equation (see the formula (7')) have been constructed is checked. For example, if a necessary number of equations have not been constructed yet, the process returns to Step (St13), and a further equation is constructed. At this time, in Step (St13), the output signals ($v_i(t)$, $v_j(t)$) of the radial gap sensors (31) are obtained when the shaft (5) is positioned at a position different from that in the previous step (St13) (specifically, at a time different from that in the previous step (St13)).

On the other hand, if a determination is made in Step (St15) that a number of equations large enough to solve the simultaneous equation (see the formulae (7')) have been constructed, the process in Step (St16) is performed. In Step (St16), unknown parameters (i.e., $p_i=(a_i, b_i, c_i)$ and $p_j=(a_j, b_j, c_j)$) are optimized using, for example, a genetic algorithm to minimize the norm of the left side values of the obtained simultaneous equation. Then, the solutions obtained by this optimization are determined to be the unknown parameters. A situation where all of the unknown parameters have been determined as described above means that a transformation formula for transforming the output signal (v) of the radial gap sensor (31) into the gap (g) has been constructed.

The transformation formula associated with the radial gap sensor (31) serving as the target for calibration is stored in the memory device forming part of the controller (40), for example, in the form of a function or table (e.g., an array variable) in the program. Thus, the calibrating operation of the radial gap sensor (31) serving as the target for calibration is completed. However, if a radial gap sensor (31) that needs calibration is still left, the process returns to Step (St11), and the calibrating operation is continued for the radial gap sensor (31) that needs calibration.

<Advantages of Embodiment>

As described above, in this embodiment, a gap sensor provided for a magnetic bearing can be easily calibrated. In addition, in this embodiment, an accurate gap can be detected without taking a countermeasure leading to an increase in cost, such as the provision of a linearization circuit for each gap sensor. Moreover, in this embodiment, a plurality of gap sensors can be calibrated at the same time. This enables efficient calibration.

In this embodiment, an example in which the two gap sensors are calibrated has been described. However, three or more gap sensors can also be calibrated at the same time. In this case, the inverse matrix of the formula (6') cannot be defined, but may be replaced with the pseudo-inverse matrix.

The trajectory along which the shaft (5) (floating body) is moved does not have to be circumferential. For example, the shaft (5) may be moved in a parabola or may be allowed to fall freely. The parameter (s) indicating the trajectory can be eliminated by a process suitable for an associated one of various forms of the trajectory.

If the geometric relational expression is determined as appropriate, the three or more constraints can be set for the thrust gap sensors (32), just like the radial gap sensors (31), by assigning the outputs respectively read from the thrust gap sensors (32). In other words, just like the example of the radial gap sensors (31), a transformation formula for the thrust gap sensors (32) can also be constructed based on the above-described principle. Examples of the trajectory along which the shaft (5) (disk portion (5a)) is moved to calibrate the thrust gap sensors (32) include a trajectory along which the shaft (5) is allowed to fall freely in the axial direction of the shaft (5).

Second Embodiment of Invention

In a second embodiment of the invention, too, three or more constraints for associating a gap (g) with the output of an associated one of gap sensors (31, 32) are set, and a transformation formula for transforming the output of the gap sensor (31, 32) into the gap (g) is constructed using the constraints. Specifically, to set the three or more constraints, a condition where if a shaft (5) (floating body) is located at the upper or lower limit of a movable range of the shaft (5), the output signals (voltages or currents) of the radial gap sensors (31) and the thrust gap sensors (32) each have a local minimum value or a local maximum value is used in the second embodiment. The principle and procedure of calibration will be described below using the radial gap sensors (31) again as an example.

<Principle of Calibration>

For example, suppose that, just like the first embodiment, the shaft (5) is moved in a circle. If the trajectory of the shaft (5) has already been known like this case, the position of the shaft (5) where an output signal (v) from each radial gap sensor (31) has a local maximum value, and the position of the shaft (5) where the output signal (v) has a local minimum value have already been known. In other words, the gap (g) formed when the output signal (v) from the gap sensor (31, 32) has a local maximum value, and the gap (g) formed when the output signal (v) has a local minimum value have also already been known. For example, revolving the shaft (5) just like the first embodiment allows the output signal (v) to have a local minimum value when the shaft (5) and the radial touchdown bearings (6) are in contact with each other at the position of the associated radial gap sensor (31). The gap (g) at this timing may be considered to be zero. On the other hand, the revolution allows the output signal (v) to have a local maximum value when the gap (g) between the associated radial gap sensor (31) and the shaft (5) is maximum (the associated radial gap sensor (31) and the shaft (5) are furthest from each other). The gap (g) at this timing can be calculated from the diameter (known value) of the shaft (5) and the inner diameter (known value) of the radial touchdown bearings (6).

Here, the gap (g) formed when the output signal ($v_i$) of the gap sensor (i) has a local maximum value is defined as a gap ($g_{i\_Max}$), and the gap (g) formed when the output signal ($v_j$) has the local minimum value is defined as a gap ($g_{i\_Min}$). Likewise, the gap (g) formed when the output signal ($v_j$) of the gap sensor (j) has the local maximum value is defined as a gap ($g_{j\_Max}$), and the gap (g) formed when the output signal ($v_j$) has the local minimum value is defined as a gap ($g_{j\_Min}$). The local maximum value of the output signal ($v_i$) of the gap sensor (i) is denoted by $v_{i\_Max}$, and the local maximum value of the gap sensor (j) is denoted by $v_{j\_Max}$. The local minimum value of the output signal ($v_i$) of the gap sensor (i) is denoted by $v_{i\_Min}$, and the local minimum value of the gap sensor (j) is denoted by $v_{j\_Max}$. Assuming that in this example, too, the gap detection values ($g_i\hat{}$, $g_j\hat{}$) of the gap sensors (i, j) respectively correspond to the actual gaps ($g_i$, $g_j$) (i.e., $g_i\hat{}=g_i$, $g_j\hat{}=g_j$), the following relational expressions can be obtained based on the previously described formulae (1') and (2').

$$g_{i\_Max}=a_i \times v_{i\_Max}^2 + b_i \times v_{i\_Max} + c_i \quad (9)$$

$$g_{i\_Min}=a_i \times v_{i\_Min}^2 + b_i \times v_{i\_Min} + c_i \quad (10)$$

$$g_{j\_Max}=a_j \times v_{j\_Max}^2 + b_j \times v_{j\_Max} + c_j \quad (11)$$

$$g_{j\_Min}=a_j \times v_{j\_Min}^2 + b_j \times v_{j\_Min} + c_j \quad (12)$$

If the unknown parameters ($b_i$, $c_i$) are solved based on the formulae (9) and (10), and the unknown parameters ($b_j$, $c_j$) are solved based on the formulae (11) and (12), these unknown parameters can be each represented by $a_i$ or $a_j$. Assigning the unknown parameters $(b_i, c_i)$ and $(b_j, c_j)$ respectively represented by $a_i$ and $a_j$ to the formulae (1') and (2') reduces the unknown parameters to two parameters, i.e., $a_i$ and $a_j$. In other words, two of the unknown parameters for the radial gap sensors (31) can be eliminated. As can be seen, in this embodiment, the number of unknown parameters to be determined by an optimization algorithm (see the first embodiment) is reduced. Thus, this embodiment can simplify an arithmetic algorithm for optimization (see the first embodiment) and shorten the calculation time.

<Calibrating Procedure of this Embodiment>

Figure 11:
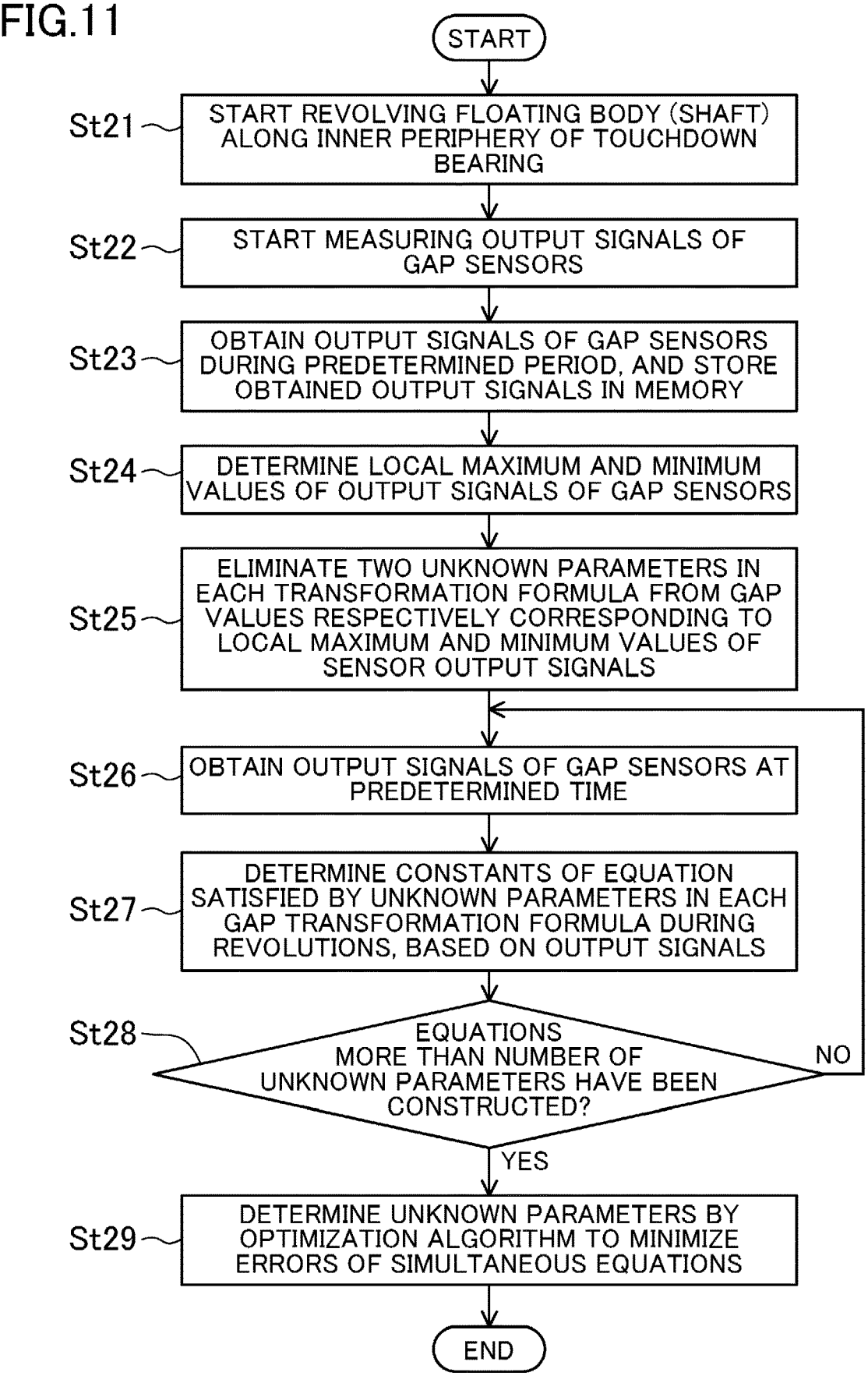
FIG. 11 is a flowchart showing a calibrating procedure according to a second embodiment.

An actual calibrating procedure based on the foregoing principle of calibration will be described using the radial gap sensors (31) as an example. Just like the first embodiment, this calibrating procedure may also be partly or totally implemented, for example, in the form of a program incorporated in a separately prepared personal computer (hereinafter referred to as the "calibration apparatus" for convenience of description also in this embodiment). FIG. 11 is a flowchart showing a calibrating procedure according to the second embodiment. An example in which two radial gap sensors (31) are calibrated will be described below. For description of the calibrating procedure, the same reference characters (such as $v_i$) as those used in the previous description of <Principle of Calibration> are assigned to output signals and other components as necessary.

In Step (St21) in the flowchart of this embodiment, a process similar to that in Step (St11) of the first embodiment is performed. Specifically, sending a predetermined signal from the calibration apparatus to a radial control unit (41) causes the shaft (5) to move such that the trajectory of the axis of the shaft (5) forms a circumference having a center coinciding with the axis of radial touchdown bearings (6). In Step (St22), the calibration apparatus determines a combination of a plurality of radial gap sensors (31) including at least one radial gap sensor (31) serving as a target for calibration, and starts measuring the output signals (v) of the radial gap sensors (31).

In Steps (St23) to (St25), a search is conducted for local maximum and minimum values of each of the output signals (here, also referred to as the "output signals $(v_i, v_j)$") of selected ones of the radial gap sensors (31). In other words, in these steps, the output signals $(v_i, v_j)$ output when the shaft (5) and one of the selected radial gap sensors (31) are closest to each other and when the shaft (5) and the other one of the selected radial gap sensors (31) are furthest from each other are obtained. Specifically, in Step (St23), the output signals $(v_i, v_j)$ of the selected radial gap sensors (31) during the revolutions of the shaft (5) are sampled at predetermined intervals for a predetermined period, and the values obtained by the sampling are stored in the memory device. In this example, the output signals $(v_i, v_j)$ of the selected radial gap sensors (31) are each paired with the period elapsed (the time) since the start of the revolutions, and such pairs are stored in the memory device. During the sampling period, the shaft (5) is set to pass through the position at which it is closest to the one of the selected radial gap sensors (31) and the position at which it is furthest from the other one of the selected radial gap sensors (31).

In Step (St24), by checking the values of the output signals $(v_i, v_j)$ of the selected radial gap sensors (31) stored in the memory device, the time when the output signal $(v_i, v_j)$ of each radial gap sensor (31) reaches a local maximum value and the time when the output signal $(v_i, v_j)$ reaches a local minimum value are checked. In Step (S24), the values of the output signals $(v_i, v_j)$ corresponding to these times (i.e., the local maximum and minimum values) are obtained from the memory device. In Step (St25), the constraints are set based on the local maximum and minimum values of the output signals $(v_i, v_j)$ of the radial gap sensors (31) and the values of the gaps (g) respectively corresponding to these local maximum and minimum values. Based on these constraints, two unknown parameters included in the transformation formula corresponding to each radial gap sensor (31) are eliminated.

In Step (St26), the output signals $v_i(t)$ and $v_j(t)$ at a predetermined time (t) from the radial gap sensors (31) selected in Step (St22) are obtained. The values obtained here are values other than the local maximum and minimum values. In Step (St26), the output signals $(v_i, v_j)$ may be actually obtained from associated ones of the radial gap sensors (31), or the values stored in the memory device may be used.

In Step (St27), the constants of one simultaneous equation (see the formulae (8')) are determined using the output signals $(v_i(t), v_j(t))$ at the time (t) obtained in Step (St26). That is to say, one equation is constructed. In other words, the constraints are set. Next, in Step (St28), whether or not a number of formulae (equations) large enough to solve the simultaneous equation (see the formula (7')) have been constructed is checked. For example, if a necessary number of equations have not been constructed yet, the process returns to Step (St26), and a further equation is constructed. At this time, in Step (St26), the output signals $(v_i(t), v_j(t))$ of the radial gap sensors (31) are obtained when the shaft (5) is positioned at a position different from that in the previous step (St26) (specifically, at a time different from that in the previous step (St26)).

On the other hand, if a determination is made in Step (St28) that a number of equations large enough to solve the simultaneous equation (see the formula (7')) have been constructed, the process in Step (St29) is performed. In Step (St29), just like the example of the first embodiment, unknown parameters are optimized using, for example, a genetic algorithm. Then, the solutions obtained by this optimization are determined to be the unknown parameters. A situation where all of the unknown parameters have been determined as described above means that a transformation formula for transforming the output of the radial gap sensor (31) into the gap (g) has been constructed.

The transformation formula associated with the radial gap sensor (31) serving as the target for calibration is stored in the memory device forming part of the controller (40), for example, in the form of a function or table (e.g., an array variable) in the program. Thus, the calibrating operation of the radial gap sensor (31) serving as the target for calibration is completed. However, if a radial gap sensor (31) that needs calibration is still left, the process returns to Step (St21), and the calibrating operation shown in the flowchart in FIG. 11 is continued for the radial gap sensor (31) that needs calibration.

<Advantages of Embodiment>

The foregoing calibrating procedure provides the same advantages as those in the first embodiment. In addition, in this embodiment, an algorithm for determining unknown parameters is simplified. Thus, the calibrating procedure of this embodiment can shorten the calculation time as compared with the calibrating method of the first embodiment. In other words, in this embodiment, the gap sensors (31, 32) can be more easily calibrated.

The calibrating method of this embodiment can also be applied to the thrust gap sensors (32). While the thrust touchdown bearing (7) and the shaft (5) are in contact with each other, the output signals ($v_i$, $v_j$) of the thrust gap sensors (32) also have the greatest or smallest value. This fact can be used for calibration. Examples of the trajectory along which the shaft (5) (disk portion (5a)) is moved to calibrate the thrust gap sensors (32) include a trajectory along which the shaft (5) is allowed to fall freely in the axial direction of the shaft (5).

Instead of the position at which the output signal ($v_i$, $v_j$) of each gap sensor (31, 32) has a local maximum or minimum value, the position at which the gap (g) for any one of the electromagnet groups (51 to 54) has a local maximum or minimum value may be used as a reference. Specifically, calibration is performed using the output signals ($v_i$, $v_j$) in a state where any one of the electromagnet groups (51 to 54) attracts the shaft (5) such that the shaft (5) is in contact with the radial touchdown bearings (6) (i.e., a state where the gap (g) between the one of the electromagnet groups (51 to 54) and the shaft (5) has the local minimum value). Even if the gap (g) between the electromagnet group (51 to 54) and the shaft (5) has the local minimum value as described above, the gap between the gap sensor (31, 32) serving as the target for calibration and the shaft (5) can be easily calculated.

Third Embodiment of Invention

In a third embodiment of the invention, too, three or more constraints for associating a gap (g) with the output of an associated one of radial gap sensors (31) are set, and a transformation formula for transforming the output of the radial gap sensor (31) into the gap (g) is constructed using the constraints. The principle and procedure of calibration will be described below using the radial gap sensors (31) again as an example.

<Principle of Calibration>
—Outline—

In this example, while a shaft (5) is moved along the trajectory passing through the upper or lower limit of a movable range of the shaft (5), a position detection sensor (to be described below) configured to detect that the shaft (5) is present at the upper or lower limit is used to read the outputs of the gap sensors (31, 32) when the shaft (5) is at the upper or lower limit. The three or more constraints are set based on the read outputs of the gap sensors (31, 32) and positional information on the upper or lower limit, thereby constructing a transformation formula. In this case, in this embodiment, a gap sensor different from one of the gap sensors serving as a target for calibration is used as the position detection sensor.

—Details of Calibration—

In the following description, the gap sensor (31, 32) serving as the target for calibration is a gap sensor (i), and the gap sensor (31, 32) serving as the position detection sensor is a gap sensor (j). Specifically, in this example, the predetermined gap sensor (i) is calibrated using an output signal ($v_j$) of the different gap sensor (j). Here, the gap sensors (i, j) are mounted as shown in FIG. 9. In this embodiment, too, the transformation formulae for obtaining the gap detection values ($g_i\hat{}$, $g_j\hat{}$) based on the output signals ($v_i$, $v_j$) of the gap sensors (i, j), respectively, are in the same form as the formula (1') (i.e., a quadratic equation). Also in this embodiment, the unknown parameters ($b_i$) and ($c_i$) are eliminated in advance or represented by $a_i$ by the technique described in the second embodiment. In other words, in this embodiment, only $a_i$ is an unknown parameter.

Also in this embodiment, during calibration, the shaft (5) is revolved along the inner circumference of each radial touchdown bearing (6) just like the first embodiment. The trajectory of the shaft (5) (floating body) during this revolution can be expressed using a parameter (s) as follows.

$$x(s)=\cos(s), y(s)=\sin(s)$$

The geometric relationship between the gap ($g_i$, $g_i$) at the position of each gap sensor (i, j) and the trajectory [x(s), y(s)] can also be expressed as the formulae (3') and (4'). Then, the value of the parameter (s) allowing the gap ($g_j$) to be a local minimum value (here, $s_N$) is determined as follows, based on the formula (4').

$$s_N=\theta$$

In general, the output signal ($v_j$) and the gap ($g_j$) has a monotonically increasing relationship. Thus, while the gap ($g_j$) has a local minimum value, the output signal ($v_j$) of the gap sensor (j) also has a local minimum value. Thus, if the parameter (s) is equal to $s_N$, the parameter (s) corresponds to the output signal ($V_{iN}$) of the gap sensor (j) output when the output signal ($v_j$) has the local minimum value. Also in this case, if the actual gap ($g_i$) and the gap detection value ($g_i\hat{}$) are equal to each other, the following formulae can be obtained based on the formula (1'), thereby determining $a_i$.

$$g_i=g_{i0}-\cos(s_N)=g_{i0}-\cos\theta$$

$$g_i\hat{}=a_iv_{iN}^2+b_i(a_i)v_{iN}+c_i(a_i)$$

If the relationship $g_i=g_i\hat{}$ is applied to the above formulae, the following formula can be obtained.

$$g_{i0}-\cos\theta=a_iv_{iN}^2+b_i(a_i)v_{iN}+c_i(a_i) \quad (13)$$

In the foregoing formula, $V_{iN}$, $b_i$, and $c_i$ are known values. Thus, the value of $a_i$ can be determined by obtaining the value of the left side. In other words, determining the value of the left side of the formula (13) allows construction of a transformation formula. To determine the value of the left side of the formula (13), the output signal (v) of the radial gap sensor (31) that is not the target for calibration is used in this embodiment. Specifically, in this embodiment, the shaft (5) (floating body) is moved so that its position at which the output signal (v) of the radial gap sensor (31) that is not the target for calibration has a local maximum or minimum value can be identified. The radial gap sensor (31) that is not the target for calibration is used as a position detection sensor configured to determine that the shaft (5) is located at the upper or lower limit of the movable range of the shaft (5). If a condition where the output signal (voltage or current) has a local maximum or minimum value is used to set the constraints, a determination can be made whether or not the shaft is present at the upper or lower limit of the movable range. Thus, the radial gap sensor (31) used as the position detection sensor does not need to have been calibrated.

If a detection is made that the shaft (5) is present at the upper or lower limit of the movable range of the shaft (5), it is possible to determine the gap (g) at the radial gap sensor (31) serving as the target for calibration by considering the outer diameter of the shaft (5) and the inner diameter of each radial gap sensor (31). That is to say, the constraints can be set. If the constraints can be set, the unknown parameter can be specified by determining the unknown parameter through search using an optimization algorithm, such as a genetic algorithm. In other words, a transformation formula can be constructed.

<Calibrating Procedure of this Embodiment>

An actual calibrating procedure based on the foregoing principle of calibration will be described using the radial gap sensors (31) as an example. Just like the first embodiment, this calibrating procedure may also be partly or totally implemented, for example, in the form of a program incorporated in a separately prepared personal computer (hereinafter referred to as the "calibration apparatus" for convenience of description also in this embodiment).

Figure 12:
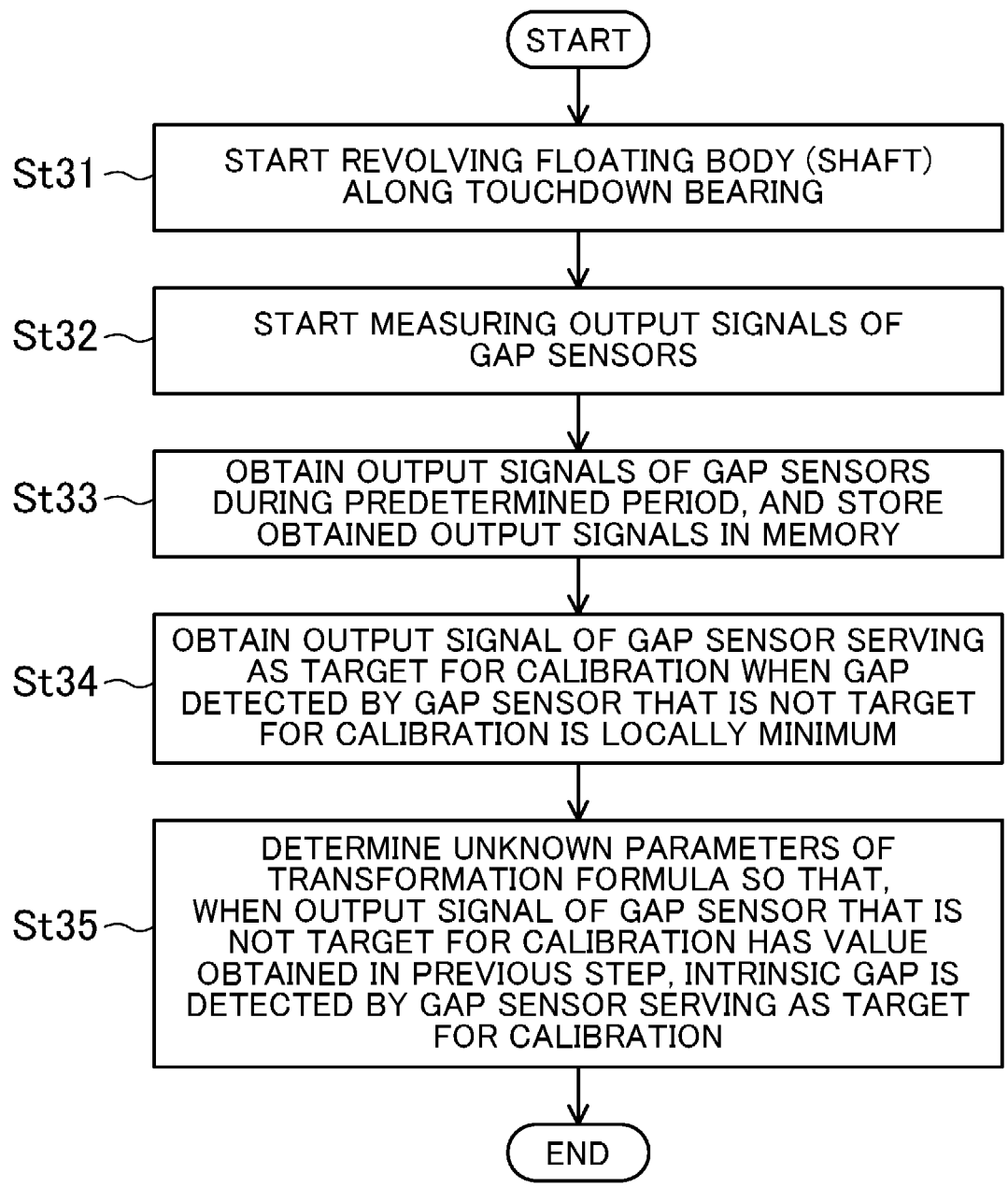
FIG. 12 is a flowchart showing a calibrating procedure according to a third embodiment.

In this embodiment, to set the three or more constraints, the position of the shaft (5) (floating body) is identified using a gap sensor (31, 32) that is not the target for "calibration." The constraints are set by using the thus-obtained positional information or other pieces of information. A condition where if the shaft (5) (floating body) is located at the upper or lower limit of the movable range of the shaft (5), the output signals (voltages or currents) of the radial gap sensors (31) and the thrust gap sensors (32) each have a local minimum or maximum value is used also in this embodiment to set the constraints. FIG. 12 is a flowchart showing a calibrating procedure according to the third embodiment. An example in which two radial gap sensors (31) are calibrated will be described below. For description of the calibrating procedure, the same reference characters (such as $v_i$) as those used in the previous description of <Principle of Calibration> are assigned to output signals and other components as necessary.

Also in Step (St31) in the flowchart of this embodiment, a process similar to that in Step (St11) of the first embodiment is performed. Specifically, sending a predetermined signal from the calibration apparatus to a radial control unit (41) causes the shaft (5) to move such that the trajectory of the axis of the shaft (5) forms a circumference having a center coinciding with the axis of radial touchdown bearings (6). According to this way of moving the shaft (5), a position of the shaft (5) at which the output signal (hereinafter referred to as the "output signal $(v_j)$") of the radial gap sensor (31) that is not a target for calibration has a local maximum value, and a position thereof at which the output signal $(V_j)$ has a local minimum value can be identified. Naturally, the trajectory along which the shaft (5) (floating body) is moved does not have to be circumferential. For example, the shaft (5) may be moved in a parabola, or may be allowed to fall freely. In summary, the shaft (5) (floating body) merely needs to be moved so that its position at which the output signal $(v_j)$ of the radial gap sensor (31) that is not the target for calibration has a local maximum or minimum value can be identified.

In Step (St32), the calibration apparatus determines a combination of a plurality of radial gap sensors (31) including at least one radial gap sensor (31) serving as a target for calibration, and starts measuring the output signals $(v_i, v_j)$ of the radial gap sensors (31). In Step (St33), the output signals $(v_i, v_j)$ of the radial gap sensors (31) during the revolutions of the shaft (5) are sampled at predetermined intervals for a predetermined period, and the values obtained by sampling are stored in the memory device. In this example, the output signals $(v_i, v_j)$ of the radial gap sensors (31) are each paired with the period elapsed (the time) since the start of the revolutions, and such pairs are stored in the memory device.

In Step (St34), by checking the output signal $(v_j)$, stored in the memory device, of the radial gap sensor (31) that is not the target for calibration, the time when the output signal $(v_j)$ of the radial gap sensor (31) that is not the target for calibration reaches a local minimum value is checked. In addition, the output signal $(v_i)$, which corresponds to this time, of the radial gap sensor (31) that is the target for calibration is obtained from the memory device.

In Step (St35), an unknown parameter (here, $a_i$) for constructing a transformation formula is calculated. Specifically, the output signal $(v_i)$ of the radial gap sensor (31) serving as the target for calibration corresponds to the value of the left side of the formula (13), i.e., $(g_{i0}-\cos\theta)$, which can be determined using the output signal $(v_j)$ of the radial gap sensor (31) that is not the target for calibration (i.e., the position detection sensor). Specifically, if the output signal $(v_j)$ of the radial gap sensor (31) that is not the target for calibration has a local minimum or maximum value, it is possible to identify the position of the shaft (5). It is therefore also possible to calculate the gap between the radial gap sensor (31) serving as the target for calibration and the shaft (5) (i.e., the value of the left side of the formula (13)). This allows the three or more constraints to be set. Using these constraints allows the unknown parameter (here, $a_i$) for constructing the transformation formula to be calculated. If the unknown parameter is determined in this manner, the calibrating operation of the radial gap sensor (31) serving as the target for calibration is completed. However, if a radial gap sensor (31) that needs calibration is still left, the process returns to Step (St31), and the calibrating operation is continued for the radial gap sensor (31) that needs calibration.

<Advantages of Embodiment>

The foregoing calibrating procedure provides the same advantages as those in the first embodiment. In addition, in this embodiment, an algorithm for determining an unknown parameter is simplified. Thus, the calibrating procedure of this embodiment can shorten the calculation time as compared with the calibrating method of the first embodiment. In other words, in this embodiment, the gap sensors (31, 32) can be more easily calibrated.

In this embodiment, an example in which the two gap sensors are calibrated has been described. However, three or more gap sensors can also be calibrated at the same time. In this case, the inverse matrix of the formula (6) cannot be defined, but may be replaced with the pseudo-inverse matrix.

Also in this embodiment, instead of the position at which the output signal $(v_i, v_j)$ of each gap sensor (31, 32) has a local maximum or minimum value, the position at which the gap (g) for any one of the electromagnet groups (51 to 54) has a local maximum or minimum value may be used as a reference. Specifically, calibration can be performed using the output signals $(v_i, v_j)$ in a state where any one of the electromagnet groups (51 to 54) attracts the shaft (5) such that the shaft (5) is in contact with the radial touchdown bearings (6) (i.e., a state where the gap (g) between the one of the electromagnet groups (51 to 54) and the shaft (5) has the local minimum value). Even if the gap (g) between the electromagnet group (51 to 54) and the shaft (5) has the local minimum value as described above, it is possible to calculate easily the gap between the gap sensor (31, 32) serving as the target for calibration and the shaft (5) by considering the outer diameter of the shaft (5) and the inner diameter of each radial gap sensor (31).

The calibrating method of this embodiment can also be applied to the thrust gap sensors (32). While the thrust touchdown bearing (7) and the shaft (5) are in contact with each other, the output signals $(v_i, v_j)$ of the thrust gap sensors (32) also have the greatest or smallest value. This fact can be used to identify the position of the shaft (5). Examples of the trajectory along which the shaft (5) (disk portion (5a)) is moved to calibrate the thrust gap sensors (32) include a trajectory along which the shaft (5) is allowed to fall freely in the axial direction of the shaft (5).

Fourth Embodiment of Invention

In a fourth embodiment of the invention, too, three or more constraints for associating a gap (g) with the output of an associated one of radial gap sensors (31) are set, and a transformation formula for transforming the output of the radial gap sensor (31) into the gap (g) is constructed using the constraints. The principle and procedure of calibration will be described below using the radial gap sensors (31) again as an example.

<Principle of Calibration>

In this example, too, while a shaft (5) is moved along the trajectory passing through the upper or lower limit of a movable range of the shaft (5), a position detection sensor (to be described below) configured to detect that the shaft (5) is present at the upper or lower limit is used to read the outputs of the gap sensors (31, 32) when the shaft (5) is at the upper or lower limit. The three or more constraints are set based on the read outputs of the gap sensors (31, 32) and positional information on the upper or lower limit, thereby constructing a transformation formula. In this case, in this embodiment, current sensors (8) configured to detect the magnitude of current flowing through associated coils (65) is used as position detection sensors, unlike the foregoing embodiments. Specifically, in this embodiment, to determine the value of the left side of the formula (13), the current sensors (8) are used to determine that the shaft (5) is present at the upper or lower limit of the movable range of the shaft (5).

Specifically, in this embodiment, the current sensors (8) detect that the shaft (5) is present at the upper or lower limit by utilizing a condition in which the inductance of the coils (65) is changed in accordance with the gap (g). For further details, in this embodiment, the following fact is utilized: the gap (g) is proportional to the amplitude of the current flowing through the coils (65) and inversely proportional to the voltage applied to the coils (65). Specifically, in this embodiment, a "voltage having a predetermined amplitude" is superimposed on the voltage applied to the coils (65) to move the shaft (5) along the trajectory, and the ratio between the amplitude of the superposed voltage and the amplitude of the current detected by the current sensors (8) is checked, thereby determining that the shaft (5) is present at the upper or lower limit of the movable range of the shaft (5).

In this case, the applied "voltage having a predetermined amplitude" is set to be a voltage prevented from affecting levitation control of the shaft (5). Here, the "voltage prevented from affecting . . . " means a voltage low enough to prevent the gap sensors (31, 32) from detecting the motion of the shaft (5) even if this voltage causes the shaft (5) to move. As the "voltage having a predetermined amplitude," for example, a sinusoidal wave or a pulse having a higher frequency than the voltage applied for levitation control (here, a voltage for achieving the trajectory) may be applied to the coils.

If a determination is made in the foregoing manner that the shaft (5) is present at the upper or lower limit of the movable range of the shaft (5), it becomes possible to determine the gap (g) at the radial gap sensor (31) serving as the target for calibration. That is to say, the constraints can be set. If the constraints can be set, the unknown parameter can be specified by determining the unknown parameter through search using an optimization algorithm, such as a genetic algorithm. In other words, a transformation formula can be constructed.

<Calibrating Procedure of this Embodiment>

An actual calibrating procedure based on the foregoing principle of calibration will be described using the radial gap sensors (31) as an example. Just like the first embodiment, this calibrating procedure may also be partly or totally implemented, for example, in the form of a program incorporated in a separately prepared personal computer (hereinafter referred to as the "calibration apparatus" for convenience of description also in this embodiment).

Figure 13:
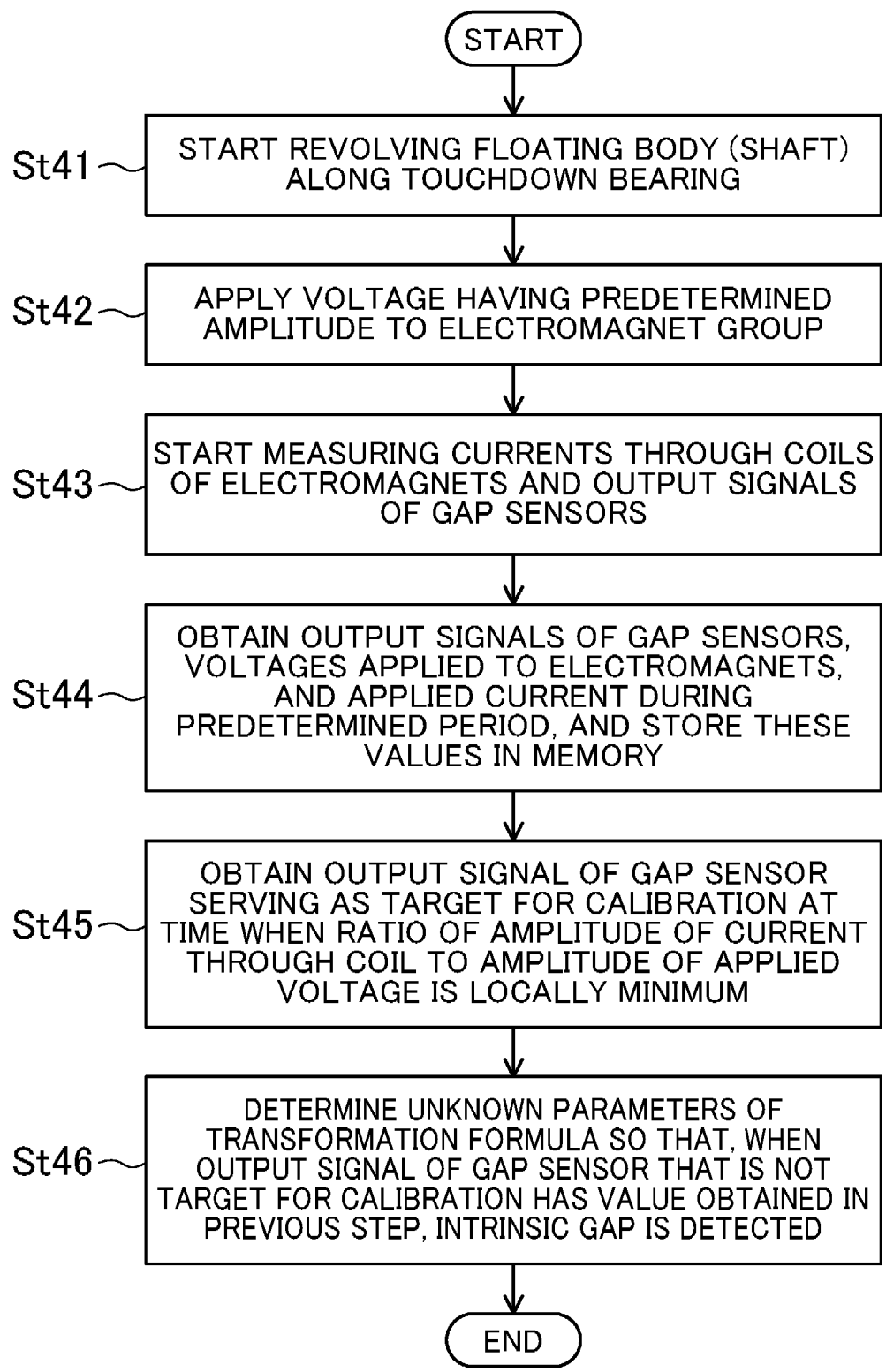
FIG. 13 is a flowchart showing a calibrating procedure according to a fourth embodiment.

Also in this embodiment, to set the three or more constraints, the position of the shaft (5) (floating body) is identified using the current sensors (8). The constraints are set by using the thus-obtained positional information or other pieces of information. A condition where if the shaft (5) (floating body) is located at the upper or lower limit of the movable range of the shaft (5), the output signals (voltages or currents) of the radial gap sensors (31) and the thrust gap sensors (32) each have a local minimum or maximum value is used also in this embodiment to set the constraints. FIG. 13 is a flowchart showing a calibrating procedure according to the fourth embodiment. An example in which two radial gap sensors (31) are calibrated will be described below.

Also in Step (St41) in the flowchart of this embodiment, a process similar to that in Step (St11) of the first embodiment is performed. Specifically, sending a predetermined signal from the calibration apparatus to a radial control unit (41) causes the shaft (5) to move such that the trajectory of the axis of the shaft (5) forms a circumference having a center coinciding with the axis of radial touchdown bearings (6). According to this way of moving the shaft (5), whether or not the shaft (5) is closest to a predetermined one of the electromagnet groups (51 to 54) and further whether or not the shaft (5) is furthest from the predetermined one of the electromagnet groups (51 to 54) can be determined. Naturally, the trajectory along which the shaft (5) (floating body) is moved does not have to be circumferential. For example, the shaft (5) may be moved in a parabola, or may be allowed to fall freely.

In Step (St42), the calibration apparatus selects any one of the first to fourth electromagnet groups (51 to 54). The electromagnet group to be selected is optional. However, for example, one of the electromagnet groups generating an electromagnetic force in a direction orthogonal to the direction in which the radial gap sensor (31) serving as the target for calibration detects the gap may be selected. In Step (St42), the "voltage having a predetermined amplitude" is applied to the selected one of the electromagnet groups (51 to 54). The "voltage having a predetermined amplitude" is hereinafter referred to also as the "applied voltage." In Step (St43), one of the radial gap sensors (31) serving as the target for calibration is selected. In this embodiment, two or more of the radial gap sensors (31) can be calibrated at the same time. Thus, in this Step (St43), two or more of the radial gap sensors (31) may be selected as targets for calibration. In Step (St43), output signals ($v_i$, $v_j$) of the selected radial gap sensors (31) starts being measured.

In Step (St44), the output signals ($v_i$, $v_j$) of the selected radial gap sensors (31), the "applied voltage" to the coils (65), and a (current) value detected by the current sensor (8) during the revolutions of the shaft (5) are sampled at predetermined intervals for a predetermined period, and the values obtained by the sampling are stored in the memory device. Here, the "applied voltage" and the "current value" that are sampled both relate to one of the electromagnet groups functioning as a position detection sensor. In this example, the values stored in the memory device, such as the output signals ($v_i$, $v_j$) of the radial gap sensors (31), are each associated with the period elapsed (the time) since the start of the revolutions, and the resultant combinations are stored in the memory device. During the sampling period, the shaft (5) is set to always pass through the position at which it is closest to the electromagnet group selected in step (St42) and the position at which it is furthest from the selected electromagnet group.

In Step (St45), the value of the applied voltage and the (current) value detected by the current sensors (8) both stored in the memory device are read, and the ratio between the amplitude of the superimposed voltage and the amplitude of the current detected by the current sensors (8) is calculated. In Step (St45), the time when the calculated ratio reaches a local minimum value is checked. In addition, in Step (St45), the output signals ($v_i$, $v_j$) of the radial gap sensors (31) corresponding to the time when the ratio reaches a local minimum value are read from the memory device.

In Step (St46), unknown parameters in the transformation formula for transforming the output signals ($v_i$, $v_j$) of the radial gap sensors (31) into the detected values are calculated. This calculation requires the gap (g) at the radial gap sensor (31) serving as the target for calibration in addition to the values of the output signals ($v_i$, $v_j$) read in Step (St45). The gap (g) at the radial gap sensor (31) serving as the target for calibration can be determined using the condition where, at this time, the shaft (5) and the electromagnet group selected in Step (St42) are closest to each other. Such a process in Step (St46) allows the three or more constraints to be set, thereby determining the unknown parameters. If the unknown parameters are determined in this manner, the calibrating operation of the radial gap sensor (31) serving as the target for calibration is completed. However, if a radial gap sensor (31) that needs calibration is still left, the process returns to Step (St41), and the calibrating operation is continued for the radial gap sensor (31) that needs calibration.

<Advantages of Embodiment>

The foregoing calibrating procedure provides the same advantages as those in the first embodiment. In addition, in this embodiment, an algorithm for determining an unknown parameter is simplified. Thus, the calibrating procedure of this embodiment can shorten the calculation time as compared with the calibrating method of the first embodiment. In other words, in this embodiment, the gap sensors (31, 32) can be more easily calibrated. Moreover, in this embodiment, a plurality of gap sensors can be calibrated at the same time. This enables efficient calibration.

The calibrating method of this embodiment can also be applied to the thrust gap sensors (32). While the thrust touchdown bearing (7) and the shaft (5) are in contact with each other, the output signals ($v_i$, $v_j$) of the thrust gap sensors (32) also have the greatest or smallest value. This fact can be used to identify the position of the shaft (5). Examples of the trajectory along which the shaft (5) (disk portion (5a)) is moved to calibrate the thrust gap sensors (32) include a trajectory along which the shaft (5) is allowed to fall freely in the axial direction of the shaft (5).

Fifth Embodiment of Invention

In a fourth embodiment of the invention, too, three or more constraints for associating a gap (g) with the output of an associated one of radial gap sensors (31) are set, and a transformation formula for transforming the output of the radial gap sensor (31) into the gap (g) is constructed using the constraints. The principle and procedure of calibration will be described below using the radial gap sensors (31) again as an example.

<Principle of Calibration>

—Outline—

In this example, the shaft (5) is moved along a predetermined trajectory. The three or more constraints are set based on an equation of motion indicating the relationship between the force acting on the shaft (5) during the movement and the position of the shaft (5). Specifically, the shaft (5) is moved to its "known initial position," and a "known force" is applied to the shaft (5) to move the shaft (5) at a "known initial velocity." The three or more constraints are set based on the equation of motion.

—Details of Calibration—

Specifically, in this embodiment, the highest position in the movable range of the shaft (5) is used as the "known initial position." The "highest position" as used herein means a position at which the potential energy of the shaft (5) is highest in the movable range. Gravity is used as the "known force." The "known initial velocity" is zero. That is, in this embodiment, an equation of motion where the shaft (5) is caused to fall freely from the highest position of the movable range of the shaft (5) is used. Causing the shaft (5) to fall freely allows the position of the shaft (5) to be identified based on the period of time elapsed since the start of the free fall of the shaft (5). How to determine the position of the shaft (5) based on the equation of motion will be described below in detail.

Suppose here that the origin of the position of the shaft (5) coincides with the center of the radial touchdown bearings (6), and that the radial gap sensor (31) serving as the target for calibration is mounted vertically upward of the shaft (5). In that case, when the shaft (5) is in contact with the radial touchdown bearings (6) at the uppermost point (the highest position of the shaft (5)) of each of the touchdown bearings and is thus at rest, the vertical position of the shaft (5) and the speed of the shaft (5) can be expressed by the following formulae.

$$y(t=0)=g_{TD} \quad (14)$$

$$dy/dt(t=0)=0 \quad (15)$$

where "t" is the time elapsed since the start of the free fall, and $g_{TD}$ is a value obtained by subtracting the outer diameter of the floating body (5) from the inner diameter of the radial touchdown bearings (6) and dividing the result by 2. When the shaft (5) starts falling freely, only vertically downward gravity acts on the shaft (5). Thus, the equation of vertical motion of the floating body (5) is as follows. In the following formula, m is the mass of the floating body (5).

$$m \times d^2x/dt^2 = -m \times gr \quad (16)$$

Here, the formula (16) is integrated, and the constant of integration is determined based on the formulae (14) and (15), and the position of the floating body (5) in the vertical direction with respect to the time t is as follows. Here, gr is the acceleration of gravity. The same statement applies to the following description.

$$y(t)=g_{TD}-gr \times t^2/2$$

The position of the shaft (5) can be determined using this formula. As can be seen, being able to determine the position of the shaft (5) means also being able to calculate the gap (g) at each radial gap sensor (31) at the time corresponding to this position. In other words, being able to determine the position of the shaft (5) means being able to set the constraints. In this embodiment, the constraints are set specifically in the following manner.

First, the transformation formula for transforming the output signal (v) of the gap sensor into the gap detection value (ĝ) is defined by a quadratic polynomial of the output signal (v) just like the formula (1'). At this time, three different optional times t1, t2, and t3 from the time when the shaft (5) starts falling freely to the time when it reaches the radial touchdown bearings (6) are selected. Thus, the positions of the shaft (5) at these times are expressed as follows: $y(t1)=g_{TD}-gt_1^2/2$; $y(t2)=g_{TD}-g r \times t_2^2/2$; and $y(t3)=g_{TD}-gr \times t_3^2/2$. The output signals (v) corresponding to these times (t1, t2, and t3) are $v_1$, $v_2$, and $v_3$, respectively. The gap reference length of the radial gap sensor (31) serving as the target for calibration (the gap length obtained when the position of the shaft (5) coincides with the center of the radial touchdown bearings (6)) is defined as $g_0$. Further, the gap detection value (ĝ) is assumed to be equal to the gap (g) (ĝ=g). Based on the foregoing description, the following three formulae are obtained for the three different times t1, t2, and t3.

$$g_0-(g_{TD}-gr \times t_1^2/2)=av_1^2+bv_1+c \quad (17)$$

$$g_0-(g_{TD}-gr \times t_2^2/2)=av_2^2+bv_2+c \quad (18)$$

$$g_0-(g_{TD}-gr \times t_3^2/2)=av_3^2+bv_3+c \quad (19)$$

These formulae (17) to (19) enable setting of the constraints. This allows the unknown parameters a, b and c to be determined. If the unknown parameters are determined, a transformation formula can be constructed. In other words, "calibration" is achieved.

<Calibrating Procedure of this Embodiment>

An actual calibrating procedure based on the foregoing principle of calibration will be described using the radial gap sensors (31) as an example. Just like the first embodiment, this calibrating procedure may also be partly or totally implemented, for example, in the form of a program incorporated in a separately prepared personal computer (hereinafter referred to as the "calibration apparatus" for convenience of description also in this embodiment).

In the following description, the direction in which the third and fourth electromagnet groups (53) and (54) of the radial magnetic bearing (21) face each other (i.e., the Y direction) is the direction in which gravity acts (see FIG. 2). Further, the highest position of the shaft (5) (the position at which the potential energy of the shaft (5) is highest in the movable range of the shaft (5)) is the position of the shaft (5) attracted by the third electromagnet group (53) and being in contact with the magnetic bearing core (61).

Figure 14:
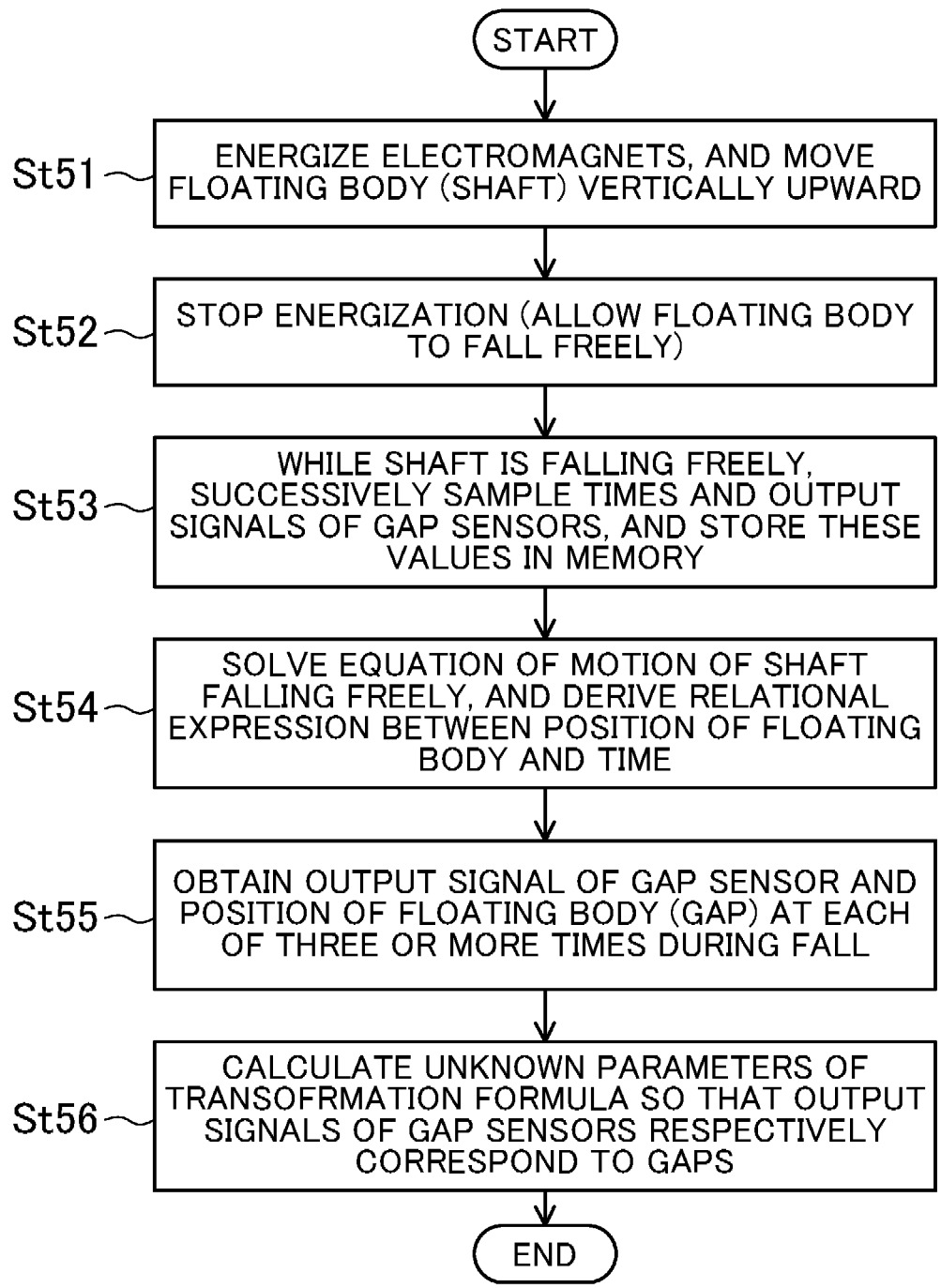
FIG. 14 is a flowchart showing a calibrating procedure according to a fifth embodiment.

FIG. 14 is a flowchart showing a calibrating procedure according to the fifth embodiment. In Step (St51) shown in FIG. 14, a current is passed through each of the coils (65) of the fifth and sixth electromagnets (75, 76) forming the third electromagnet group (53) to generate a predetermined electromagnetic force. In other words, in Step (St51), a vertically upward force is applied to the shaft (5) to lift the shaft (5). Suppose here that a line connecting the third electromagnet group (53) and the center of the associated radial touchdown bearing (6) together coincides with a line of action of the electromagnetic force generated by the third electromagnet group (53). In that case, the shaft (5) comes into contact with the radial touchdown bearing (6) at the uppermost point of the internal space of the radial touchdown bearing (6), and thus becomes stationary. In other words, in Step (St51), the shaft (5) is moved to its highest position. In Step (St52), the energization of the coils (65) of the fifth and sixth electromagnets (75, 76) is stopped. This causes the shaft (5) to fall freely by gravity.

In Step (St53), while the shaft (5) falls freely, times after the energization of the fifth and sixth electromagnets (75, 76) is stopped and the output signals (v) of the radial gap sensor (31) serving as a target for calibration are successively sampled, and the obtained output signals (v) and the corresponding times are associated with each other, and are then stored in the memory device.

In Step (St54), the fact that the gravity is the only force applied to the shaft (5) that is falling freely is used to solve the equation of motion of the shaft (5) that is falling freely. The constant of integration is determined by the coordinate value of the position (specifically, the uppermost point of the internal space of the radial touchdown bearing (6)) of the shaft (5) that is not energized.

In Step (St55), three or more times during the free fall of the shaft (5) which are sampled in Step (St53) is first selected. After the times have been selected, the relationship between the values of the output signals (v) stored in the memory device and the times corresponding to the output signals (v) is applied to the relational expressions (see the formulae (17) to (19)) during the free fall. Specifically, the values of the left sides of the formulae (17) to (19) are calculated from the times. The right sides of the formulae (17) to (19) are constructed based on the output signals (v) corresponding to the times. This enables setting of the three or more constraints. As can be seen, if the three or more constraints are determined, solving the simultaneous equations, i.e., the formulae (17) to (19), allows the unknown parameters (see the right sides of the formulae (17) to (19)) to be determined (see Step (St56)). If all the unknown parameters are determined, the calibrating operation of the radial gap sensor (31) serving as the target for calibration is completed.

<Advantages of Embodiment>

The foregoing calibrating procedure provides the same advantages as those in the first embodiment. In this embodiment, an algorithm for determining the unknown parameters is simple. Thus, the calibrating procedure of this embodiment can shorten the calculation time as compared with the calibrating method of the first embodiment. In other words, in this embodiment, the gap sensors (31, 32) can be more easily calibrated. Moreover, in this embodiment, a plurality of gap sensors can be calibrated at the same time. This enables efficient calibration.

An electromagnetic force of each of the electromagnets (71 to 78) of each radial magnetic bearing (21) is used as the "known force." Naturally, in general, gravity always acts on the floating body (5). This creates a need to consider the gravity as well in the equation of motion where the electromagnetic force of the electromagnet (71 to 78) is used.

The "known initial position" is also an example, and should not be limited to the highest position in the movable range of the shaft (5). For example, if the direction of gravity and the line of action of the electromagnetic force of the electromagnet group (51 to 54) for moving the shaft (5) to the initial position are misaligned with each other, the position of the shaft (5) closest to the electromagnet group (51 to 54) may be the "known initial position."

The calibrating method of this embodiment can also be applied to the thrust gap sensors (32). For example, if the magnetic bearing apparatus (10) is disposed such that the shaft (5) is positioned at the highest position when the thrust touchdown bearing (7) and the shaft (5) are in contact with each other, (for example, if the axial direction of the shaft (5) coincides with the direction in which gravity acts), the shaft (5) may be allowed to fall freely in the axial direction to perform the calibrating method described above.

OTHER EMBODIMENTS

The calibrating procedure described in each of the foregoing embodiments may be incorporated into the magnetic bearing apparatus (10) in the form of software, instead of being implemented in an independent calibrator (a personal computer) as described above. If the procedure is incorporated into the magnetic bearing apparatus (10), it may be implemented in the controller (40) as a program to be executed by the controller (40).

The reference object serving as a positional reference for position control (levitation control) of the floating body (5) should not be limited to the radial touchdown bearings (6) and the thrust touchdown bearing (7). For example, the radial gap sensors (31) and the thrust gap sensors (32) may serve as reference objects. In this case, for example, the distance between the distal ends of the gap sensors (31, 32) and the shaft (5) is the gap (g).

INDUSTRIAL APPLICABILITY

The present invention is useful as a method for calibrating a gap sensor.

DESCRIPTION OF REFERENCE CHARACTERS

5 Shaft (Floating Body)
6 Radial Touchdown Bearing (Auxiliary Bearing)
7 Thrust Touchdown Bearing (Auxiliary Bearing)
8 Current Sensor
21 Radial Magnetic Bearing
22 Thrust Magnetic Bearing
31 Radial Gap Sensor
32 Thrust Gap Sensor
71 to 78 Electromagnet

The invention claimed is:

1. A method for calibrating at least one gap sensor, the at least one gap sensor being provided on a magnetic bearing supporting a floating body in a non-contact manner by an electromagnetic force, the at least one gap sensor being configured to detect a gap between the floating body and a reference object that serves as a positional reference for position control of the floating body, the method comprising:
constructing a transformation formula for transforming an output signal of the at least one gap sensor into the gap, using three or more constraints that are set as conditions for associating the gap with the output signal of the at least one gap sensor.

2. The method of claim 1, wherein
the constructing includes:
moving the floating body along a predetermined trajectory;
reading output signals from the gap sensors at a plurality of different positions on the trajectory; and
setting, so as to construct the transformation formula, the three or more constraints by assigning the output signals read from the radial gap sensors to a geometric relational expression between the gap and the trajectory, the geometric relational expression constraining the output signals of the radial gap sensors.

3. The method of claim 2, wherein
the trajectory is a trajectory along which the floating body is moved while being in contact with an auxiliary bearing that is in contact with, and supporting, the floating body to prevent contact between the floating body and the magnetic bearing.

4. The method of claim 2, wherein
in the reading, an output of the at least one gap sensor is read at least at an upper or lower limit of a movable range of the floating body, and
in the constructing, one of the constraints is set based on the upper or lower limit to construct the transformation formula.

5. The method of claim 1, wherein
the constructing includes:
moving the floating body along a trajectory passing through an upper or lower limit of a movable range of the floating body;
reading an output of the at least one gap sensor when the floating body is at the upper or lower limit, using a position detection sensor configured to detect that the floating body is present at the upper or lower limit; and
setting, so as to construct the transformation formula, the three or more constraints based on the read output of the at least one gap sensor and positional information on the upper or lower limit.

6. The method of claim 5, wherein
in the constructing, another gap sensor except the gap sensor serving as a target for constructing the transformation formula is used as the position detection sensor to determine that the floating body is present at the upper or lower limit, based on a fact that a value detected by the another gap sensor serving as the position detection sensor is a local maximum value or a local minimum value.

7. The method of claim 5, wherein
in the constructing, a current sensor configured to detect a current of an electromagnet of the magnetic bearing is used as the position detection sensor to superimpose a voltage having a predetermined amplitude on a voltage that moves the floating body along the trajectory and determine that the floating body is present at the upper or lower limit, based on a ratio between an amplitude of the superimposed voltage and an amplitude of the current detected by the position detection sensor.

8. The method of claim 1, wherein
the constructing includes:
moving the floating body to a known initial position and applying a known force to the floating body so as to move the floating body at a known initial velocity; and
setting the three or more constraints based on an equation of motion indicating a relationship between the known force and a position of the floating body.

9. The method of claim 8, wherein
in the constructing, a highest position in a movable range of the floating body is used as the initial position, and gravity is used as the known force.

10. The method of claim 8, wherein
in the constructing, an electromagnetic force of an electromagnet of the magnetic bearing is applied, as the known force, to the floating body.

* * * * *